(12) United States Patent
Wu et al.

(10) Patent No.: US 10,142,640 B2
(45) Date of Patent: Nov. 27, 2018

(54) METHOD AND APPARATUS FOR USING SMALL-SIZED BUFFER IN COMPRESSION/DECOMPRESSION WITH BLOCK PREDICTION

(71) Applicant: MEDIATEK INC., Hsin-Chu (TW)

(72) Inventors: Tung-Hsing Wu, Chiayi (TW); Kun-Bin Lee, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 687 days.

(21) Appl. No.: 14/531,930

(22) Filed: Nov. 3, 2014

(65) Prior Publication Data

US 2015/0131730 A1 May 14, 2015

Related U.S. Application Data

(60) Provisional application No. 61/902,867, filed on Nov. 12, 2013.

(51) Int. Cl.
*H04N 19/43* (2014.01)
*H04N 19/52* (2014.01)
*H04N 19/56* (2014.01)
*H04N 19/44* (2014.01)

(52) U.S. Cl.
CPC ............. *H04N 19/43* (2014.11); *H04N 19/44* (2014.11); *H04N 19/52* (2014.11); *H04N 19/56* (2014.11)

(58) Field of Classification Search
CPC ................................................... H04N 19/174
See application file for complete search history.

(56) References Cited

U.S. PATENT DOCUMENTS

| 6,493,392 | B1 | 12/2002 | Chung | |
|---|---|---|---|---|
| 2006/0023794 | A1* | 2/2006 | Wan | H04N 5/142 375/240.29 |
| 2009/0033760 | A1 | 2/2009 | Oh | |
| 2012/0033728 | A1 | 2/2012 | Cho | |
| 2014/0294089 | A1* | 10/2014 | MacInnis | H04N 19/63 375/240.19 |

FOREIGN PATENT DOCUMENTS

| CN | 101536530 A | 9/2009 |
|---|---|---|
| CN | 102082950 A | 6/2011 |
| CN | 103250417 A | 8/2013 |

OTHER PUBLICATIONS

"International Search Report" dated Feb. 26, 2015 for International application No. PCT/CN2014/090869, International filing date:Nov. 12, 2014.

* cited by examiner

*Primary Examiner* — Anner N Holder
*Assistant Examiner* — Hesham K Abouzahra
(74) *Attorney, Agent, or Firm* — Winston Hsu

(57) ABSTRACT

A buffer device is used by a compressor/decompressor with block prediction for storing information needed to encode/decode a pixel line. Vector information (e.g., final block prediction vector information and/or partial block prediction vector information) of at least one later pixel group is computed while a current pixel group is being encoded/decoded. The buffer device does not need to store vector information of all pixel groups of one pixel line at the same time. For example, one pixel line is composed of M pixel groups; and when the compressor/decompressor is encoding/decoding the current pixel line, final/partial vector information sets of at most K pixel groups are allowed to be stored in the buffer device simultaneously, where K is a positive integer smaller than M.

22 Claims, 10 Drawing Sheets

(A)

(B)

METHOD AND APPARATUS FOR USING SMALL-SIZED BUFFER IN COMPRESSION/DECOMPRESSION WITH BLOCK PREDICTION

CROSS REFERENCE TO RELATED APPLICATIONS

This application claims the benefit of U.S. provisional application No. 61/902,867, filed on Nov. 12, 2013 and incorporated herein by reference.

BACKGROUND

The disclosed embodiments of the present invention relate to data compression and decompression, and more particularly, to a method and apparatus for using a small-sized buffer in compression/decompression with block prediction.

A display interface may be disposed between an application processor (AP) and a driver integrated circuit (IC) to transmit display data from the AP to the driver IC for further processing. When a display panel supports a higher display resolution, 2D/3D display with higher resolution can be realized. Hence, the display data transmitted over the display interface would have a larger data size/data rate, which increases the power consumption of the display interface inevitably. If the AP and the driver IC are both located at a portable device (e.g., a smartphone) powered by a battery device, the battery life is shortened due to the increased power consumption of the display interface.

Similarly, a camera interface may be disposed between a camera module and an image signal processor (ISP) to transmit multimedia data from the camera module to the ISP for further processing. The ISP may be part of an application processor. When a camera sensor with a higher resolution is employed in the camera module, the multimedia data transmitted over the camera interface would have a larger data size/data rate, which increases the power consumption of the camera interface inevitably. If the camera module and the ISP are both located at a portable device (e.g., a smartphone) powered by a battery device, the battery life is shortened due to the increased power consumption of the camera interface.

Data compression may be employed to reduce the data size/data rate of data transmitted over a transmission interface, such as the display interface or the camera interface. In a conventional design, a large-sized buffer is generally required to store information used for encoding/decoding a pixel line, where the buffer size depends on the image resolution. Thus, there is a need for an innovative design which can achieve the desired data compression/decompression through using a small-sized buffer, thereby reducing the hardware cost.

SUMMARY

In accordance with exemplary embodiments of the present invention, a method and apparatus for using a small-sized buffer in compression/decompression with block prediction are proposed.

According to a first aspect of the present invention, an exemplary compression method with block prediction is disclosed. The exemplary compression method includes: utilizing a vector buffer to store a final vector information set of at least one pixel group at the same time, wherein each pixel line of an image is composed of a plurality of pixel groups, and a maximum number of the at least one pixel group having the final vector information set simultaneously stored in the vector buffer is smaller than a number of the pixel groups of each pixel line; and when encoding a first pixel group in a first pixel line, obtaining a final vector information set of the first pixel group from the vector buffer, and encoding the first pixel group with the obtained final vector information set of the first pixel group, wherein the final vector information set of the first pixel group stored in the vector buffer is derived from performing block prediction search upon a second pixel line different from the first pixel line.

According to a second aspect of the present invention, an exemplary compression method with block prediction is disclosed. The exemplary compression method includes: utilizing a partial vector buffer to store a partial vector information set of at least one pixel group at the same time, wherein each pixel line of an image is composed of a plurality of pixel groups; and when encoding a first pixel group in a first pixel line, obtaining a partial vector information set of the first pixel group from the partial vector buffer, computing a final vector information set of the first pixel group based on the obtained partial vector information set of the first pixel group, and encoding the first pixel group with the computed final vector information set of the first pixel group, wherein the partial vector information set of the first pixel group stored in the partial vector buffer is derived from performing block prediction search upon a second pixel line different from the first pixel line.

According to a third aspect of the present invention, an exemplary decompression method with block prediction is disclosed. The exemplary decompression method includes: utilizing a vector buffer to store a final vector information set of at least one pixel group at the same time, wherein each pixel line of an image is composed of a plurality of pixel groups, and a maximum number of the at least one pixel group having the final vector information set simultaneously stored in the vector buffer is smaller than a number of the pixel groups of each pixel line; and when decoding a first pixel group in a first pixel line, obtaining a final vector information set of the first pixel group from the vector buffer, and decoding the first pixel group with the obtained final vector information set of the first pixel group, wherein the final vector information set of the first pixel group stored in the vector buffer is derived from performing block prediction search upon a second pixel line different from the first pixel line.

According to a fourth aspect of the present invention, an exemplary decompression method with block prediction is disclosed. The exemplary decompression method includes: utilizing a partial vector buffer to store a partial vector information set of at least one pixel group at the same time, wherein each pixel line of an image is composed of a plurality of pixel groups; and when decoding a first pixel group in a first pixel line, obtaining a partial vector information set of the first pixel group from the partial vector buffer, computing a final vector information set of the first pixel group based on the obtained partial vector information set of the first pixel group, and decoding the first pixel group with the computed final vector information set of the first pixel group, wherein the partial vector information set of the first pixel group stored in the partial vector buffer is derived from performing block prediction search upon a second pixel line different from the first pixel line.

According to a fifth aspect of the present invention, an exemplary compressor with block prediction is disclosed. The exemplary compressor includes a vector buffer and an encoder. The vector buffer is configured to store a final vector information set of at least one pixel group at the same time, wherein each pixel line of an image is composed of a plurality of pixel groups, and a maximum number of the at least one pixel group having the final vector information set simultaneously stored in the vector buffer is smaller than a number of the pixel groups of each pixel line. When encoding a first pixel group in a first pixel line, the encoder is configured to obtain a final vector information set of the first pixel group from the vector buffer, and encode the first pixel group with the obtained final vector information set of the first pixel group, wherein the encoder is further configured to derive the final vector information set of the first pixel group stored in the vector buffer from performing block prediction search upon a second pixel line different from the first pixel line.

According to a sixth aspect of the present invention, an exemplary compressor with block prediction is disclosed. The exemplary compressor includes a partial vector buffer and an encoder. The partial vector buffer is configured to store a partial vector information set of at least one pixel group at the same time, wherein each pixel line of an image is composed of a plurality of pixel groups. When encoding a pixel group in a first pixel line, the encoder is configured to obtain partial vector information set of the pixel group from the partial vector buffer, compute a final vector information set of the pixel group based on the obtained partial vector information set of the pixel group, and encode the pixel group with the computed final vector information set of the pixel group, wherein the encoder is further configured to derive the partial vector information set of the pixel group stored in the partial vector buffer from performing block prediction search upon a second pixel line different from the first pixel line.

According to a seventh aspect of the present invention, an exemplary decompressor with block prediction is disclosed. The exemplary decompressor includes a vector buffer and a decoder. The vector buffer is configured to store a final vector information set of at least one pixel group at the same time, wherein each pixel line of an image is composed of a plurality of pixel groups, and a maximum number of the at least one pixel group having the final vector information set simultaneously stored in the vector buffer is smaller than a number of the pixel groups of each pixel line. When decoding a first pixel group in a first pixel line, the decoder is configured to obtain a final vector information set of the first pixel group from the vector buffer, and decode the first pixel group with the obtained final vector information set of the first pixel group, wherein the decoder is further configured to derive the final vector information set of the first pixel group stored in the vector buffer from performing block prediction search upon a second pixel line different from the first pixel line.

According to an eighth aspect of the present invention, an exemplary decompressor with block prediction is disclosed. The exemplary decompressor includes a partial vector buffer and a decoder. The partial vector buffer is configured to store a partial vector information set of at least one pixel group at the same time, wherein each pixel line of an image is composed of a plurality of pixel groups. When decoding a pixel group in a first pixel line, the decoder is configured to obtain partial vector information set of the pixel group from the partial vector buffer, compute a final vector information set of the pixel group based on the obtained partial vector information set of the pixel group, and decode the pixel group with the computed final vector information set of the pixel group, wherein the decoder is further configured to derive the partial vector information set of the pixel group stored in the partial vector buffer from performing block prediction search upon a second pixel line different from the first pixel line.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One concept of the present invention is to use a buffer device which stores information used for encoding/decoding a pixel line and has a buffer size not dependent on the image resolution. For example, a block prediction search standardized by a Video Electronics Standards Association (VESA) display stream compression (DSC) may be used in compression/decompression. The present invention proposes computing vector information (e.g., final block prediction vector information and/or partial block prediction vector information) of at least one later pixel group while encoding/decoding a current pixel group. Hence, the proposed compression/decompression design of the present invention does not need to store vector information of all pixel groups of one pixel line at the same time. However, the conventional compression/decompression design includes following operations: encoding/decoding a second pixel line above a first pixel line to obtain a reconstructed pixel line; after the reconstructed pixel line is obtained, using the reconstructed pixel line to compute block prediction vectors for all pixel groups in the first pixel line, and storing the block prediction vectors into a line vector buffer; and encoding/decoding the first pixel line with the vector information stored in the line vector buffer. Compared to the conventional compression/decompression design, the proposed compression/decompression design can use a small-sized buffer to accomplish encoding/decoding of one pixel line of an image. In this way, the hardware cost can be reduced correspondingly. Further details of the proposed compression/decompression design using a small-sized buffer are described as below.

It should be noted that, based on certain coding standards, the reconstructed pixel line generated at a decoder side may also be called a decoded pixel line. In the following, the term "reconstructed pixel line" is used at both the encoder side and the decoder side for clarity and simplicity. However, a person skilled in the pertinent art should readily appreciate that the term "reconstructed pixel line" and the term "decoded pixel line" may be interchangeable at the decoder side.

Figure 1:
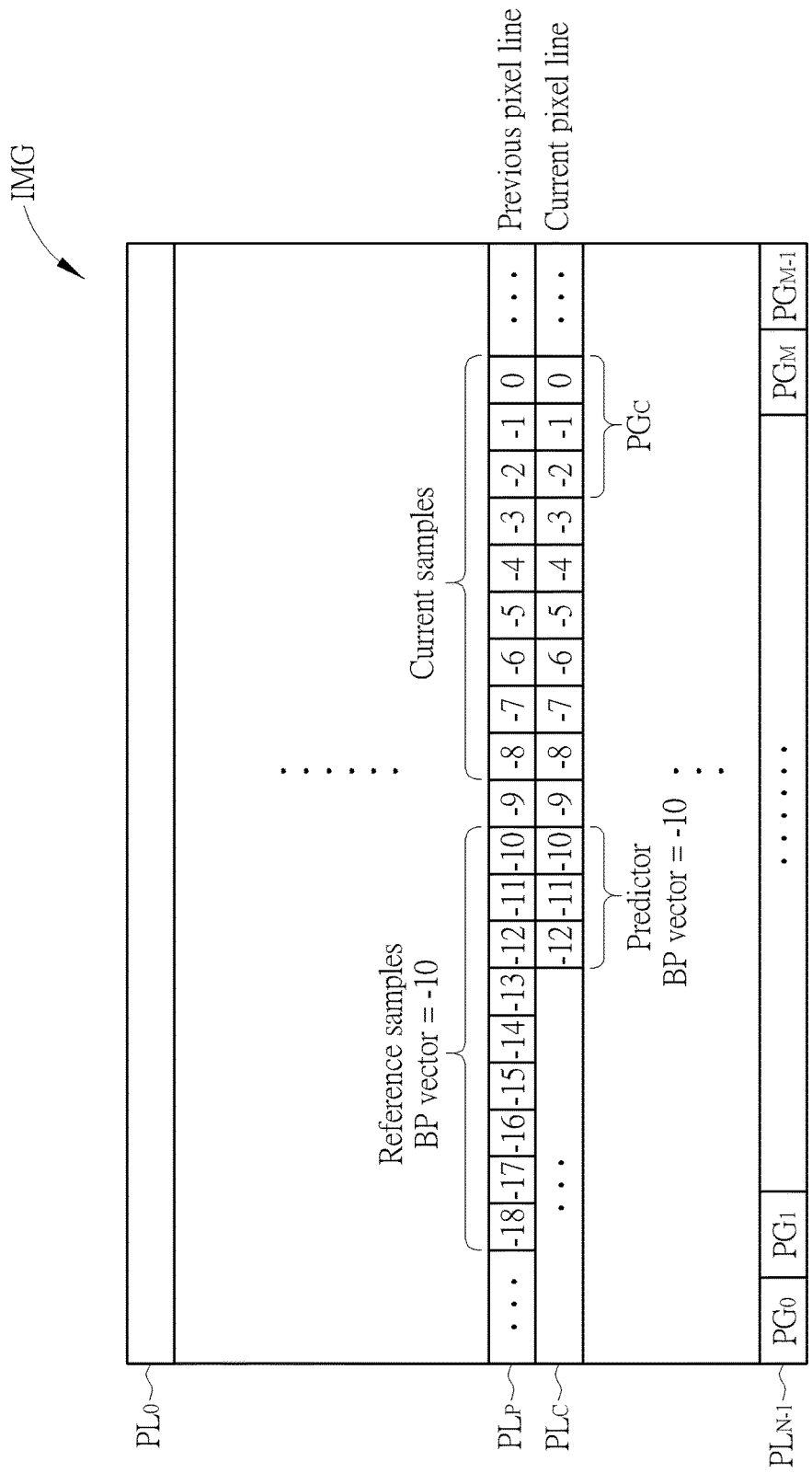
FIG. 1 is a diagram illustrating a block prediction used in either of a proposed compressor and a proposed decompressor of the present invention for computing a final vector information set of a pixel group.

The present invention proposes a method and apparatus for using a small-sized buffer in compression/decompression with block prediction. For better understanding of technical features of the present invention, the block prediction (BP) is briefly described with reference to FIG. 1, which is a diagram illustrating a block prediction used in either of a proposed compressor and a proposed decompressor of the present invention for computing a final vector information set of a pixel group. In the present invention, one final vector information set would correspond to one pixel group, where the final vector information set includes the final block prediction vector information of the pixel group. As shown in FIG. 1, one image IMG is composed of a plurality of pixel lines $PL_0$-$PL_{N-1}$, each of the pixel lines $PL_0$-$PL_{N-1}$ is composed of a plurality of pixel groups $PG_0$-$PG_{M-1}$, and each of the pixel groups $PG_0$-$PG_{M-1}$ is composed of a plurality of pixels (e.g., 3 pixels). The values of M and N may be any positive integers, depending upon the image resolution of the image IMG. The block prediction is used to predict a current sample (i.e., a current pixel) from a previous reconstructed sample in the same pixel line (i.e., a left reconstructed pixel in the same pixel line). The previous reconstructed sample is a BP predictor found using the BP search process, where an offset from the current sample to the BP predictor is called a BP vector. More specifically, the BP vector and the decision of whether or not to use the block prediction are determined automatically by the block prediction function, which is the same in both of an encoder used in a compressor and a decoder used in a decompressor. The BP vector and decision applies to a pixel group composed of multiple pixels (e.g., 3 pixels in a group).

The BP search to find the best BP vector for a current pixel group (e.g., $PG_C$) in a current pixel line (e.g., $PL_C$) is performed on a previous pixel line (e.g., $PL_P$) rather than the current pixel line. In other words, no samples from the current pixel line are used to determine a BP vector for any pixel group in the current pixel line. Since the previous pixel line is encoded/decoded earlier than the current pixel line, a reconstructed pixel line is therefore used by the BP search. It should be noted that block prediction is not allowed on the upper-most pixel line $PL_0$ because the previous pixel line (i.e., an upper pixel line) is not available. The BP search compares a set of 9 consecutive current samples with sets of nine consecutive reference samples. And a set of reference samples corresponds to a block prediction vector with the range from −3 to −10. For each vector considered, a SAD (sum of absolute differences) is calculated over 9 samples in each of the current set and reference set. The vector with the lowest SAD value is selected. In cases of ties, the vector closest to the offset 0 is selected. As shown in FIG. 1, the lowest SAD block prediction vector may be −10. When the block prediction is enabled and the lowest SAD block prediction vector is determined to be the final BP vector, the current pixel group $PG_C$ may be encoded/decoded with a reconstructed pixel group in the current pixel line that is pointed to by the BP vector −10 (i.e., reconstructed samples in the current pixel line that are indexed by offsets {−10, −11, −12}).

It should be noted that the lowest SAD block prediction vector found using the BP search is a candidate BP vector, and several criteria are checked to determine whether or not the candidate BP vector can become the final BP vector. For example, the 9-pixel SAD of the vector −1 is also calculated in order to determine whether BP or MMAP (Modified Medium Adaptive Prediction) should be used. In addition, the parameters checked in the criteria may include the position of current vector-processing pixel group (hPos), the block prediction count (bpCount), the number of pixels that have gone by since an "edge" occurred (lastEdgeCount), and the number of pixels in current vector-processing pixel group. As a person skilled in the pertinent art can readily understand details of selecting between BP and MMAP, further description is omitted here for brevity.

When the prediction type is determined to be BP, the value of the final BP vector may be referred to as the final vector information included in the "final vector information set" hereinafter, and information needed for deciding the final BP vector, such as SAD values, value of the lowest SAD block prediction vector, and/or the aforementioned parameters, may be referred to as the partial vector information included in the "partial vector information set" hereinafter. In the present invention, one partial vector information set would correspond to one pixel group. The partial vector information set can be used to deriving the final vector information. For example, the partial vector information set includes the information extracted from pixel data corresponding to the current vector-processing pixel group, where the pixel data include the pixel data of a previous reconstructed pixel line. Hence, the partial vector information set may include at least one of the SAD corresponding to the candidate block prediction vector, the position of current vector-processing pixel group (hPos), the block prediction count (bpCount), the number of pixels that have gone by since an "edge" occurred (lastEdgeCount), and the number of pixels in current vector-processing pixel group. However, this is for illustrative purposes only, and is not meant to be a limitation of the present invention.

Figure 2:
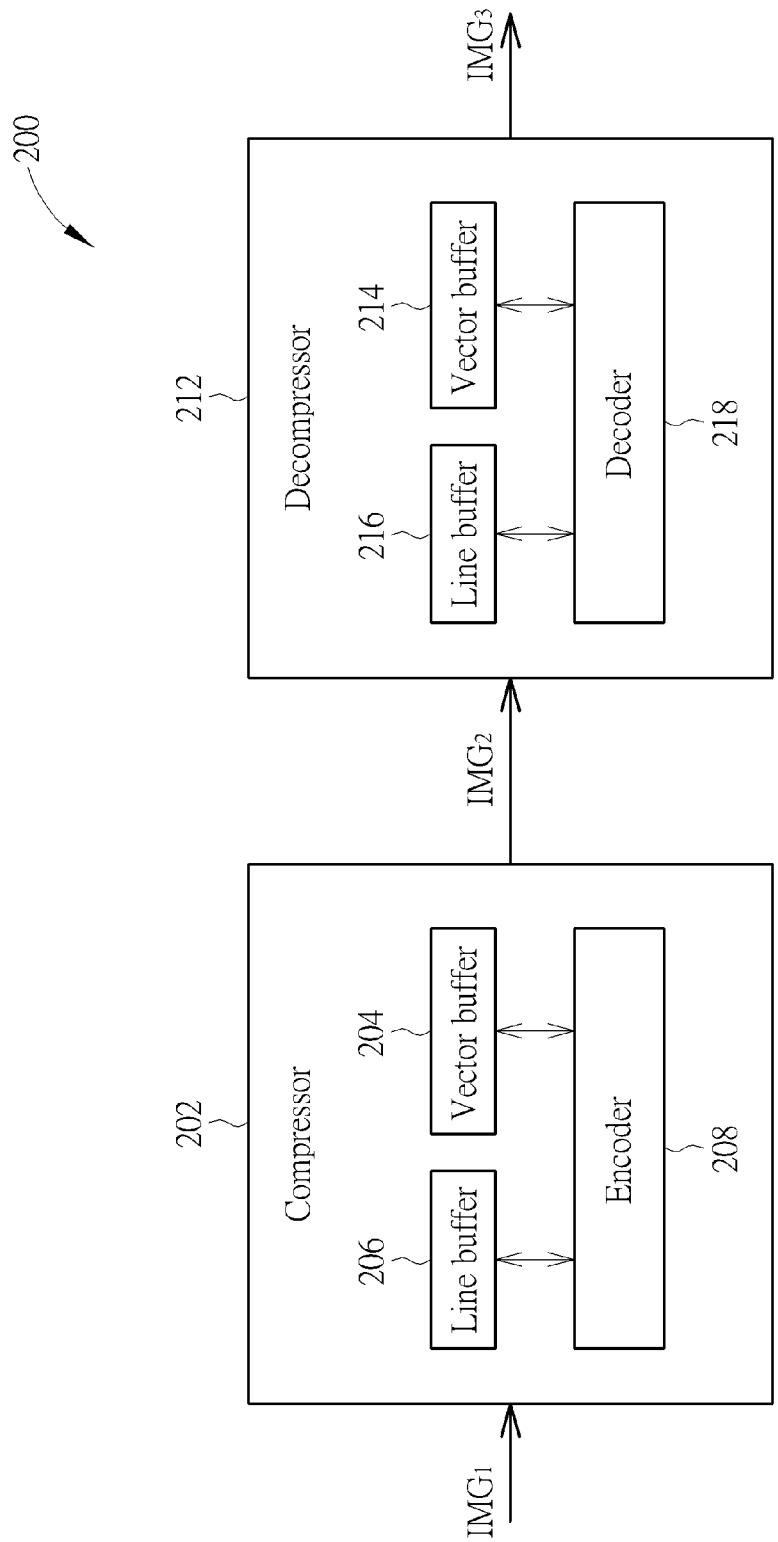
FIG. 2 is a diagram illustrating one data processing system according to an embodiment of the present invention.

FIG. 2 is a diagram illustrating one data processing system according to an embodiment of the present invention. The data processing system 200 includes a compressor 202 and a decompressor 212, each supporting block prediction (e.g., a block prediction function standardized by a Video Electronics Standards Association (VESA) display stream compression (DSC)). In this embodiment, the compressor 202 with block prediction includes a vector buffer 204, a line buffer 206, and an encoder 208; and the decompressor 212 with block prediction includes a vector buffer 214, a line buffer 216, and a decoder 218. It should be noted that only the circuit components pertinent to the present invention are shown in FIG. 2. In practice, each of compressor 202 and decompressor 212 may include additional circuit components, depending upon actual design consideration. As shown in FIG. 2, the compressor 202 is configured to compress an input image (e.g., an uncompressed image) $IMG_1$ to generate a compressed image $IMG_2$, and the decompressor 212 is configured to decompress the compressed image $IMG_2$ to generate a decompressed image $IMG_3$.

Supposing that the image IMG shown in FIG. 1 is the input image $IMG_1$ to be compressed by the compressor 202 shown in FIG. 2, the input image $IMG_1$ is composed of pixel lines $PL_0$-$PL_{N-1}$, each of the pixel lines $PL_0$-$PL_{N-1}$ is composed of pixel groups $PG_0$-$PG_{M-1}$, and each of the pixel groups $PG_0$-$PG_{M-1}$ is composed of multiple pixels (e.g., 3 pixels). The line buffer 206 is configured to store reconstructed pixels of at least one reconstructed pixel line generated from a reconstruction loop of the encoder 208. After the encoder 208 finishes encoding the previous pixel line $PL_P$, a reconstructed pixel line involved in encoding the previous pixel line $PL_P$ is stored in the line buffer 206 for further use. For example, the block prediction and/or other encoding procedures may operate based at least partly on at least one reconstructed pixel line stored in the line buffer 206. The vector buffer 204 is configured to store a final vector information set of at least one pixel group at the same time, wherein the maximum number of pixel group(s) having final vector information set(s) simultaneously stored in the vector buffer 204 is smaller than the number of pixel groups of each pixel line. For example, when the encoder 208 is encoding the current pixel line $PL_C$, final vector information sets of at most K pixel groups are allowed to be stored in the vector buffer 204 simultaneously, where K is a positive integer smaller than M (i.e., K<M). In one exemplary implementation, the maximum number of pixel group (s) having final vector information set(s) simultaneously stored in the vector buffer 204 is a fixed value during encoding of the input image $IMG_1$. That is, the value of K is fixed during the encoding of the input image $IMG_1$. The size of the vector buffer 204 does not depend on the image resolution due to the fact that the vector buffer 204 does not need to store final vector information sets of all pixel groups in one pixel line. Hence, the production cost of the compressor 202 can be reduced correspondingly.

In this embodiment, before encoding a first pixel group in a first pixel line (e.g., the current pixel group $PG_C$ in the current pixel line $PL_C$), the encoder 208 is configured to derive the final vector information set of the first pixel group from performing BP search upon a second pixel line (e.g., a reconstructed pixel line obtained from the previous pixel line $PL_P$) different from the first pixel line, and store the final vector information set of the first pixel group into the vector buffer 204. When encoding the first pixel group in the first pixel line, the encoder 208 is further configured to obtain the final vector information set of the first pixel group from the vector buffer 204, and encode the first pixel group with the obtained final vector information set of the first pixel group. In addition, the encoder 208 is further configured to compute a final vector information set of a second pixel group (which is encoded later than the first pixel group), and store the computed final vector information set of the second pixel group into the vector buffer 204. For example, after the final vector information set of the first pixel group is read from the vector buffer 204 for encoding the first pixel group, the final vector information set of the first pixel group in the vector buffer 204 is allowed to be overwritten.

In this embodiment, final vector information sets of at most K pixel groups are allowed to be stored in the vector buffer 204, simultaneously. Since the size of the vector buffer 204 is set based on the value of K, the distance between the first pixel group (which is a pixel group currently being encoded) and the second pixel group (which is a pixel group to be encoded later) in the encoding order is equal to K. In a case where the encoder 208 is equipped with higher computing power, the value of K may be set by a smaller positive integer. In another case where the encoder 208 is equipped with lower computing power, the value of K may be set by a larger positive integer. It should be noted that the second pixel group may be located in a pixel line identical to or different from (e.g., below) the first pixel line in which the first pixel group is located.

Figure 3:
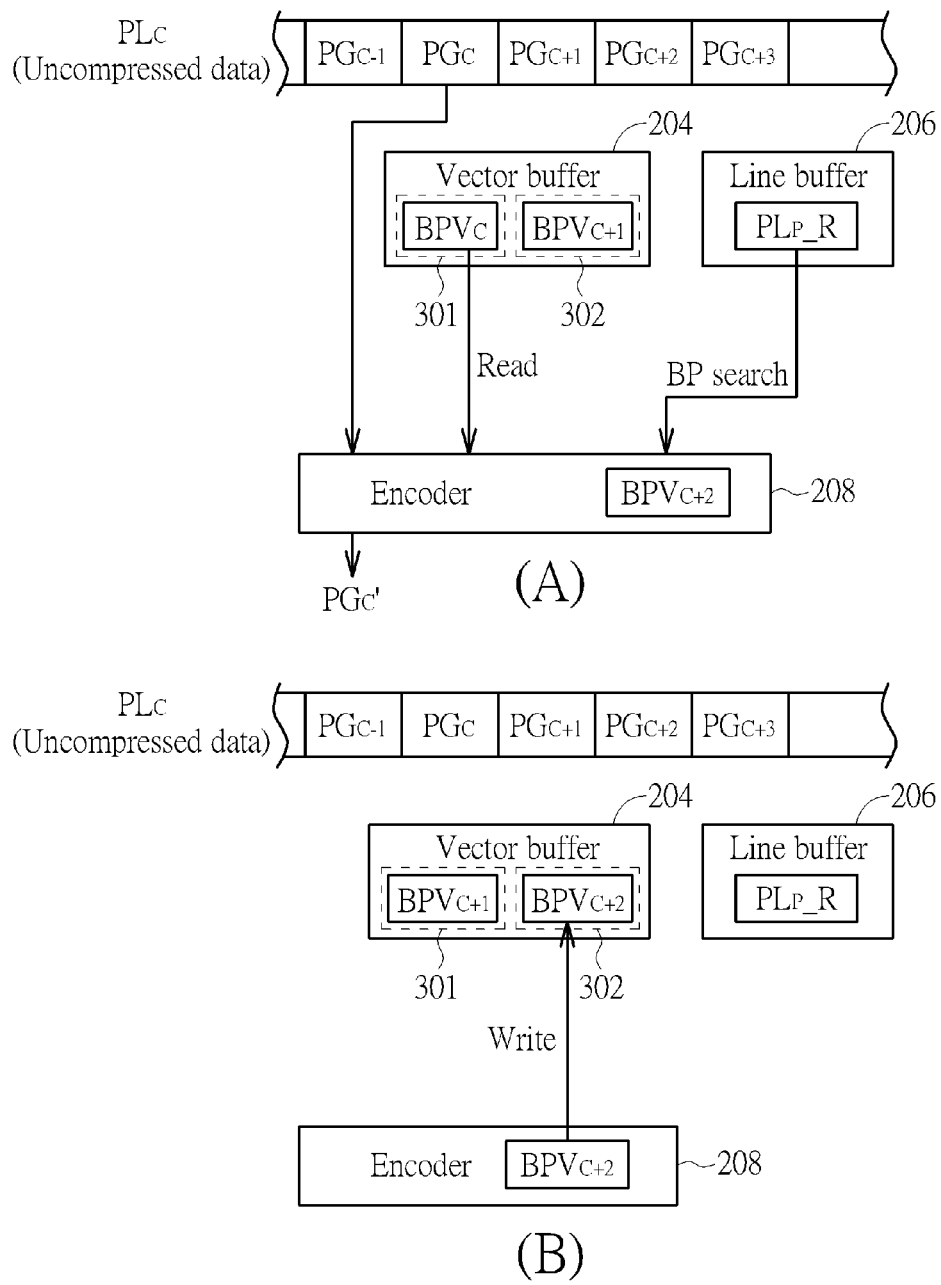
FIG. 3 is a diagram illustrating an exemplary compression operation performed by the compression shown in FIG. 2 according to an embodiment of the present invention.

FIG. 3 is a diagram illustrating an exemplary compression operation performed by the compressor 202 shown in FIG. 2 according to an embodiment of the present invention. Before the encoder 208 starts encoding the current pixel line $PL_C$, the line buffer 206 stores a reconstructed pixel line $PL_P\_R$ obtained from the encoding of the previous pixel line $PL_P$. In this example, K=2. Hence, the vector buffer 204 implemented in the compressor 202 has two buffer entries 301 and 302. Before the encoder 208 starts encoding the current pixel group $PG_C$ in the current pixel line $PL_C$, the buffer entry 301 stores the final vector information set $BPV_C$ of the current pixel group $PG_C$, and the buffer entry 302 stores the final vector information set $BPV_{C+1}$ of the next pixel group $PG_{C+1}$. The pixel group $PG_{C+1}$ will be encoded after the encoding of the current pixel group $PG_C$ is completed. In other words, the pixel group $PG_{C+1}$ will become a current pixel group after the encoding of the current pixel group $PG_C$ is completed.

The sub-diagram (A) of FIG. 3 shows a first phase of encoding the current pixel group $PG_C$. The encoder 208 obtains the final vector information set $BPV_C$ from the buffer entry 301, and encodes the current pixel group $PG_C$ with the obtained final vector information set $BPV_C$ to generate an encoded pixel group $PG_C'$ (which is part of the compressed image $IMG_2$ generated from the compressor 202). Since the final vector information set $BPV_{C+1}$ is not read from the vector buffer 204 for encoding the pixel group $PG_{C+1}$ yet and the pixel group $PG_{C+2}$ will be encoded after the encoding of the pixel group $PG_{C+1}$ is completed, the encoder 208 computes a final vector information set $BPV_{C+2}$ of the pixel group $PG_{C+2}$ by performing BP search based on the reconstructed pixel line $PL_P\_R$.

The sub-diagram (B) of FIG. 3 shows a second phase of encoding the current pixel group $PG_C$. In one exemplary design, the vector buffer 204 may be instructed to shift the final vector information set $BPV_{C+1}$ in the buffer entry 302 to the buffer entry 301, thus overwriting the final vector information set $BPV_C$. Next, the encoder 208 stores the computed final vector information set $BPV_{C+2}$ into the buffer entry 302. Hence, at the end of the encoding of the pixel group $PG_C$ (i.e., at the beginning of the encoding of the pixel group $PG_{C+1}$), the buffer entry 301 of the vector buffer 204 stores the final vector information set $BPV_{C+1}$ of the pixel group $PG_{C+1}$, and the buffer entry 302 of the vector buffer 204 stores the final vector information set $BPV_{C+2}$ of the pixel group $PG_{C+2}$. However, this is for illustrative purposes only, and is not meant to be a limitation of the present invention. In another exemplary design, the vector buffer 204 may store the computed final vector information set $BPV_{C+2}$ into the buffer entry 301, thus overwriting the final vector information set $BPV_C$. Hence, at the end of the encoding of the pixel group $PG_C$ (i.e., at the beginning of the encoding of the pixel group $PG_{C+1}$), the buffer entry 302 of the vector buffer 204 stores the final vector information set $BPV_{C+1}$ of the pixel group $PG_{C+1}$, and the buffer entry 301 of the vector buffer 204 stores the final vector information set $BPV_{C+2}$ of the pixel group $PG_{C+2}$. The same objective of keeping multiple final vector information sets in the vector buffer 204 is achieved.

As a person skilled in the art can readily understand details of encoding following pixel groups after reading above paragraphs directed to the example of encoding the pixel group $PG_C$, further description is omitted here for brevity.

The final vector information set used for encoding each pixel group is not signaled in a bitstream transmitted from a transmitting end having the compressor 202 to a receiving end having the decompressor 212. Hence, the same BP search operation performed by the encoder 208 used in the compressor 202 is also performed by the decoder 218 used in the decompressor 212.

Please refer to FIG. 2 again. Supposing that the image IMG shown in FIG. 1 is the compressed image $IMG_2$ to be decompressed by the decompressor 212 shown in FIG. 2, the compressed image $IMG_2$ is composed of pixel lines $PL_0$-$PL_{N-1}$, each of the pixel lines $PL_0$-$PL_{N-1}$ is composed of pixel groups $PG_0$-$PG_{M-1}$, and each of the pixel groups $PG_0$-$PG_{M-1}$ is composed of multiple pixels (e.g., 3 pixels). The line buffer 216 is configured to store reconstructed pixels of at least one reconstructed pixel line generated from decoding at least one pixel line of the compressed image $IMG_2$. After the decoder 218 finishes decoding the previous pixel line $PL_P$, a reconstructed pixel line $PL_P\_R$, which is a decoding result of the previous pixel line $PL_P$, is stored in the line buffer 216 for further use. For example, the block prediction and/or other decoding procedures may operate based at least partly on reconstructed pixels stored in the line buffer 216. The vector buffer 214 is configured to store a final vector information set of at least one pixel group at the same time, wherein the maximum number of pixel group(s) having final vector information set(s) simultaneously stored in the vector buffer 214 is smaller than the number of pixel groups of each pixel line. For example, when the decoder 218 is decoding the current pixel line $PL_C$, final vector information sets of at most K' pixel groups are allowed to be stored in the vector buffer 214 simultaneously, where K' is a positive integer smaller than M (i.e., K'<M). It should be noted that K' may be identical to or different from K. That is, the size of the vector buffer 214 used in the decompressor 212 may be identical to or different from the size of the vector buffer 204 used in the compressor 202. In one exemplary implementation, the maximum number of pixel group(s) having final vector information set(s) simultaneously stored in the vector buffer 214 is a fixed value during decoding of the compressed image $IMG_2$. That is, the value of K' is fixed during the decoding of the compressed image $IMG_2$. Similarly, the size of the vector buffer 214 does not depend on the image resolution due to the fact that the vector buffer 214 does not need to store vector information sets of all pixel groups in one pixel line. Hence, the production cost of the decompressor 212 can be reduced correspondingly.

In this embodiment, before decoding a first pixel group in a first pixel line (e.g., the current pixel group $PG_C$ in the current pixel line $PL_C$), the decoder 218 is configured to derive the final vector information set of the first pixel group from performing BP search upon a second pixel line (e.g., a reconstructed pixel line obtained from the previous pixel line $PL_P$) different from the first pixel line, and store the final vector information set of the first pixel group into the vector buffer 214. When decoding the first pixel group in the first pixel line, the decoder 218 is further configured to obtain the final vector information set of the first pixel group from the vector buffer 214, and decode the first pixel group with the obtained final vector information set of the first pixel group. In addition, the decoder 218 is further configured to compute a final vector information set of a second pixel group (which is decoded later than the first pixel group), and store the computed final vector information set of the second pixel group into the vector buffer 214. For example, after the final vector information set of the first pixel group is read from the vector buffer 214 for decoding the first pixel group, the final vector information set of the first pixel group in the vector buffer 214 is allowed to be overwritten.

In this embodiment, final vector information sets of at most K' pixel groups are allowed to be stored in the vector buffer 214 simultaneously. Since the size of the vector buffer 214 is set based on the value of K', the distance between the first pixel group (which is a pixel group currently being decoded) and the second pixel group (which is a pixel group to be decoded later) in the decoding order is equal to K'. In a case where the decoder 218 is equipped with higher computing power, the value of K' may be set by a smaller positive integer. In another case where the decoder 218 is equipped with lower computing power, the value of K' may be set by a larger positive integer. It should be noted that the second pixel group may be located in a pixel line identical to or different from (e.g., below) the first pixel line in which the first pixel group is located.

Figure 4:
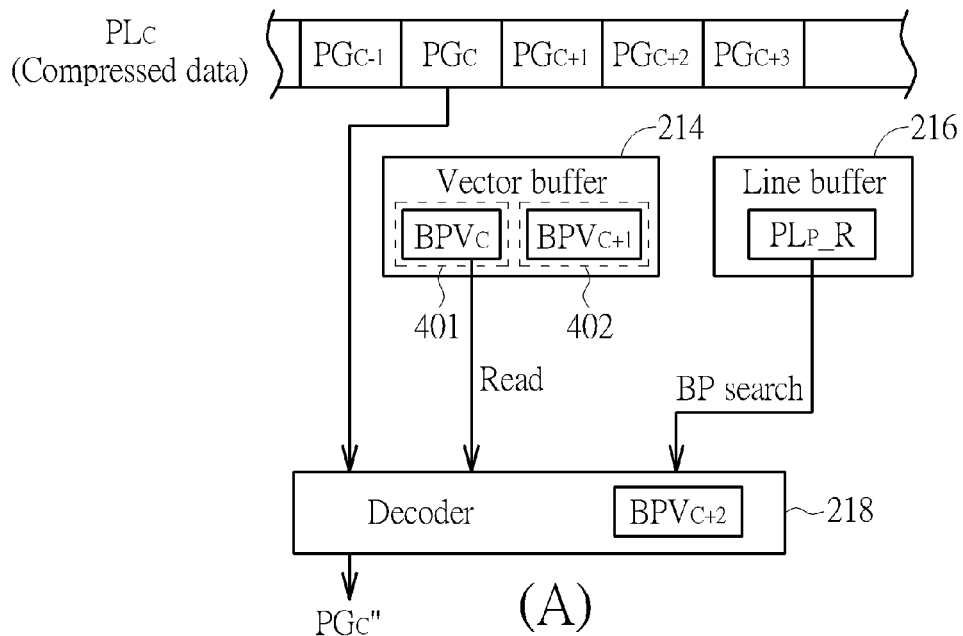
FIG. 4 is a diagram illustrating an exemplary decompression operation performed by the decompression shown in FIG. 2 according to an embodiment of the present invention.
Figure 4:
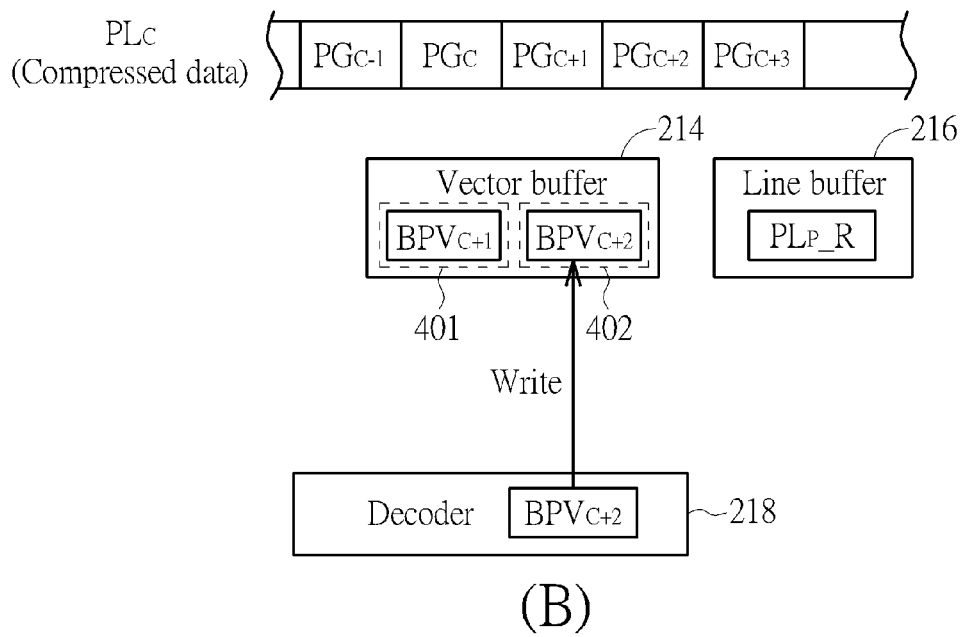

FIG. 4 is a diagram illustrating an exemplary decompression operation performed by the decompressor 212 shown in FIG. 2 according to an embodiment of the present invention. Before the decoder 218 starts decoding the current pixel line $PL_C$, the line buffer 216 stores a reconstructed pixel line $PL_P\_R$ obtained from decoding the previous pixel line $PL_P$. In this example, K'=2. Hence, the vector buffer 214 implemented in the decompressor 212 has two buffer entries 401 and 402. Before the decoder 218 starts decoding the current pixel group $PG_C$ in the current pixel line $PL_C$, the buffer entry 401 stores the final vector information set $BPV_C$ of the current pixel group $PG_C$, and the buffer entry 402 stores the final vector information set $BPV_{C+1}$ of the next pixel group $PG_{C+1}$. The pixel group $PG_{C+1}$ will be decoded after the decoding of the current pixel group $PG_C$ is completed. In other words, the pixel group $PG_{C+1}$ will become a current pixel group after the decoding of the current pixel group $PG_C$ is completed.

The sub-diagram (A) of FIG. 4 shows a first phase of decoding the current pixel group $PG_C$. The decoder 218 obtains the final vector information set $BPV_C$ from the buffer entry 401, and decodes the current pixel group $PG_C$ with the obtained final vector information set $BPV_C$ to generate a decoded pixel group $PG_C''$ (which is part of the decompressed image $IMG_3$ generated from the decompressor 212). Since the final vector information set $BPV_{C+1}$ is not read from the vector buffer 214 for decoding the pixel group $PG_{C+1}$ yet and the pixel group $PG_{C+2}$ will be decoded after the decoding of the pixel group $PG_{C+1}$ is completed, the decoder 218 computes a final vector information set $BPV_{C+2}$ of the pixel group $PG_{C+2}$ by performing BP search based on the reconstructed pixel line $PL_P\_R$.

The sub-diagram (B) of FIG. 4 shows a second phase of decoding the current pixel group $PG_C$. In one exemplary design, the vector buffer 214 may be instructed to shift the final vector information set $BPV_{C+1}$ in the buffer entry 402 to the buffer entry 401, thus overwriting the final vector information set $BPV_C$. Next, the decoder 218 stores the computed final vector information set $BPV_{C+2}$ into the buffer entry 402. Hence, at the end of the decoding of the pixel group $PG_C$ (i.e., at the beginning of the encoding of the pixel group $PG_{C+1}$), the buffer entry 401 of the vector buffer 214 stores the final vector information set $BPV_{C+1}$ of the pixel group $PG_{C+1}$, and the buffer entry 402 of the vector buffer 214 stores the final vector information set $BPV_{C+2}$ of the pixel group $PG_{C+2}$. However, this is for illustrative purposes only, and is not meant to be a limitation of the present invention. In another exemplary design, the vector buffer 214 may store the computed final vector information set $BPV_{C+2}$ into the buffer entry 401, thus overwriting the final vector information set $BPV_C$. Hence, at the end of the decoding of the pixel group $PG_C$ (i.e., at the beginning of the decoding of the pixel group $PG_{C+1}$), the buffer entry 402 of the vector buffer 214 stores the final vector information set $BPV_{C+1}$ of the pixel group $PG_{C+1}$, and the buffer entry 401 of the vector buffer 214 stores the final vector information set $BPV_{C+2}$ of the pixel group $PG_{C+2}$. The same objective of keeping multiple final vector information sets in the vector buffer 214 is achieved.

As a person skilled in the art can readily understand details of decoding following pixel groups after reading above paragraphs directed to the example of decoding the pixel group $PG_C$, further description is omitted here for brevity.

Regarding the data processing system 200 shown in FIG. 2, the encoder 208 reads a final vector information set of one pixel group (i.e., a pixel group currently being encoded) from the vector buffer 204, and computes and writes a final vector information set of another pixel group (i.e., a pixel group to be encoded later) into the vector buffer 204; and the decoder 218 reads a final vector information set of one pixel group (i.e., a pixel group currently being decoded) from the vector buffer 214, and computes and writes a final vector information set of another pixel group (i.e., a pixel group to be decoded later) into the vector buffer 214. The final vector information set dynamically computed during the encoding/decoding of each pixel line can be used to facilitate the encoding/decoding of pixel groups. In an alternative design, an encoder may be modified to support the function of computing and writing a partial vector information set of a pixel group to be encoded later into a partial vector buffer, and a decoder may be modified to support the function of computing and writing a partial vector information set of a pixel group to be decoded later into a partial vector buffer. The partial vector information set dynamically computed during the encoding/decoding of each pixel line can also be used to facilitate the encoding/decoding of pixel groups.

Figure 5:
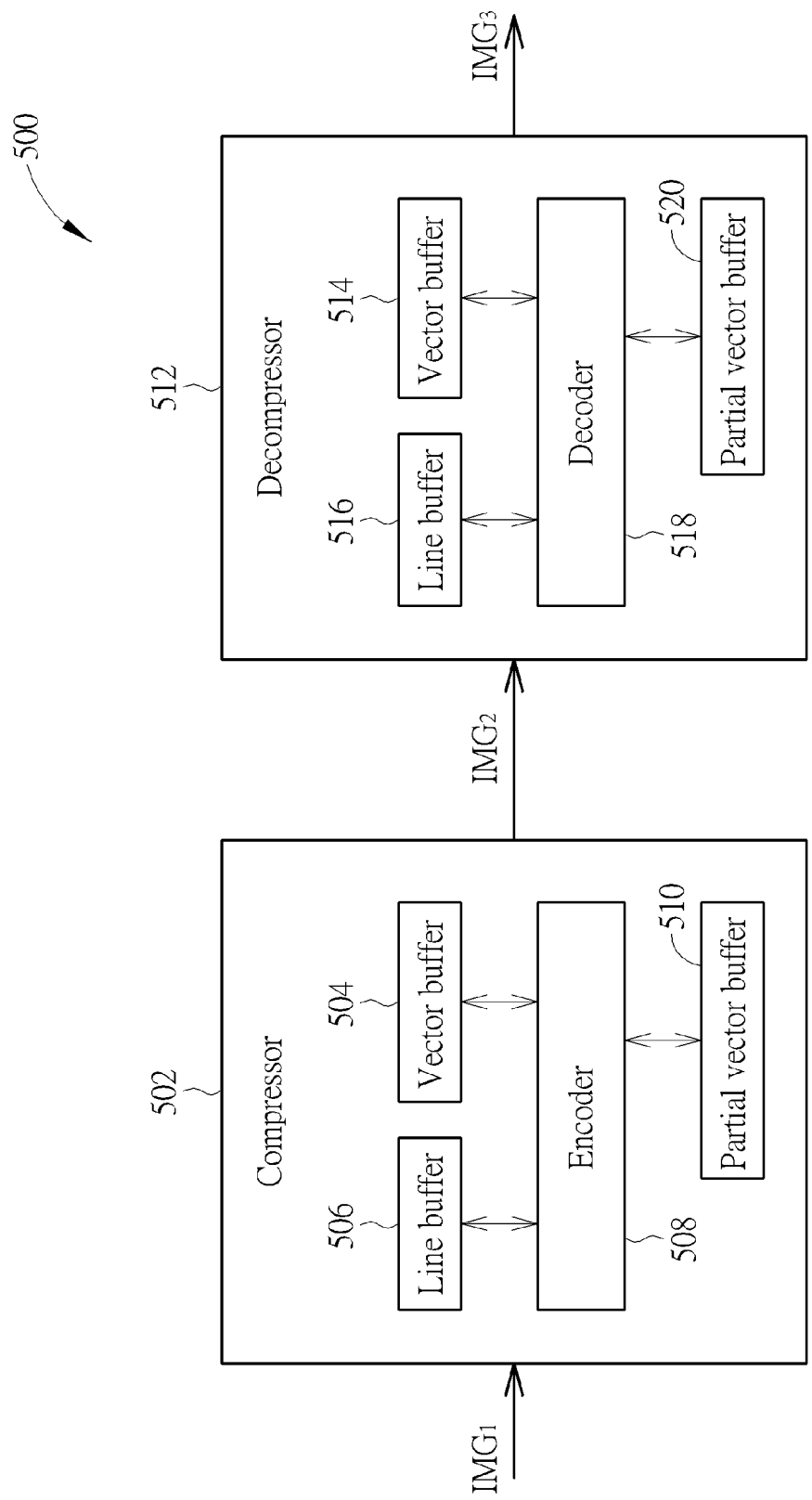
FIG. 5 is a diagram illustrating another data processing system according to an embodiment of the present invention.

FIG. 5 is a diagram illustrating another data processing system according to an embodiment of the present invention. The data processing system 500 includes a compressor 502 and a decompressor 512, each supporting block prediction (e.g., a block prediction function standardized VESA DSC). In this embodiment, the compressor 502 with block prediction includes a vector buffer 504, a line buffer 506, an encoder 508, and a partial vector buffer 510; and the decompressor 512 with block prediction includes a vector buffer 514, a line buffer 516, a decoder 518, and a partial vector buffer 520. It should be noted that only the circuit components pertinent to the present invention are shown in FIG. 5. In practice, each of compressor 502 and decompressor 512 may include additional circuit components, depending upon actual design consideration.

In this embodiment, the compressor 502 is configured to compress an input image $IMG_1$ to generate a compressed image $IMG_2$, and the decompressor 512 is configured to decompress the compressed image $IMG_2$ to generate a decompressed image $IMG_3$. Concerning the compressor 502, the operation and function of the line buffer 506 are identical to that of the line buffer 206, and the operation and function of the vector buffer 504 are identical to that of the vector buffer 204. Concerning the decompressor 512, the operation and function of the line buffer 516 are identical to that of the line buffer 216, and the operation and function of the vector buffer 514 are identical to that of the vector buffer 214.

Supposing that the image IMG shown in FIG. 1 is the input image $IMG_1$ to be compressed by the compressor 502 shown in FIG. 5, the input image $IMG_1$ is composed of pixel lines $PL_0$-$PL_{N-1}$, each of the pixel lines $PL_0$-$PL_{N-1}$ is composed of pixel groups $PG_0$-$PG_{M-1}$, and each of the pixel groups $PG_0$-$PG_{M-1}$ is composed of multiple pixels (e.g., 3 pixels). In this embodiment, the partial vector buffer 510 is configured to store a partial vector information set of at least one pixel group at the same time. At a certain time point, each of the at least one pixel group having the partial vector information set simultaneously stored in the partial vector buffer 510 is encoded later than each of at least one pixel group having the final vector information set simultaneously stored in the vector buffer 504. In other words, after the encoding of a current pixel group is completed, any partial vector information set currently stored in the partial vector buffer 510 is not used for encoding a next pixel group. Like the vector buffer 204, the vector buffer 504 is used to store a final vector information set of at least one pixel group at the same time, where the maximum number of pixel group(s) having final vector information set(s) simultaneously stored in the vector buffer 504 is smaller than the number of pixel groups of each pixel line. In addition, the sum of the maximum number of pixel group(s) having final vector information set(s) simultaneously stored in the vector buffer 504 and the maximum number of pixel group(s) having partial vector information set(s) simultaneously stored in the partial vector buffer 510 is also smaller than the number of pixel groups of each pixel line. For example, when the encoder 508 is encoding the current pixel line $PL_C$, final vector information sets of at most K1 pixel groups are allowed to be stored in the vector buffer 504 simultaneously, and partial vector information sets of at most K2 pixel groups are allowed to be stored in the partial vector buffer 510 simultaneously, where each of K1 and K2 is a positive integer, and the sum of K1 and K2 is smaller than M (i.e., K1+K2<M). In one exemplary implementation, the sum of the maximum number of pixel group(s) having final vector information set(s) simultaneously stored in the vector buffer 504 and the maximum number of pixel group(s) having partial vector information set(s) simultaneously stored in the partial vector buffer 510 is a fixed value during encoding of the input image $IMG_1$. For example, K1 and K2 are fixed values, such that the value of K1+K2 is fixed during the encoding of the input image $IMG_1$. Similarly, the size of the vector buffer 504 does not depend on the image resolution due to the fact that the vector buffer 504 does not need to store final vector information sets of all pixel groups in one pixel line. Hence, the production cost of the compressor 502 can be reduced correspondingly.

Before encoding a first pixel group in a first pixel line (e.g., the current pixel group $PG_C$ in the current pixel line $PL_C$), the encoder 508 is configured to derive the final vector information set of the first pixel group from performing BP search upon a second pixel line (e.g., a reconstructed pixel line obtained from the previous pixel line $PL_P$) different from the first pixel line, and store the final vector information set of the first pixel group into the vector buffer 504; and the encoder 508 is further configured to derive a partial vector information set of a second pixel group (which is encoded later than the first pixel group), and store the partial vector information set of the second pixel group into the partial vector buffer 510.

When encoding the first pixel group in the first pixel line, the encoder 508 is further configured to obtain the final vector information set of the first pixel group from the vector buffer 504, and encode the first pixel group with the obtained final vector information set of the first pixel group. In addition, the encoder 508 is further configured to obtain the partial vector information set of the second pixel group from the partial vector buffer 510, compute a final vector information set of the second pixel group, and store the computed final vector information set of the second pixel group into the vector buffer 504; and the encoder 508 is further configured to derive a partial vector information set of a third pixel group (which is encoded later than the second pixel group), and store the computed partial vector information set of the third pixel group into the partial vector buffer 510. For example, after the final vector information set of the first pixel group is read from the vector buffer 504 for encoding the first pixel group, the final vector information set of the first pixel group in the vector buffer 504 is allowed to be overwritten. Similarly, after the partial vector information set of the second pixel group is read from the partial vector buffer 510 for computing the final vector information set of the second pixel group, the partial vector information set of the second pixel group in the partial vector buffer 510 is allowed to be overwritten.

In this embodiment, final vector information sets of at most K1 pixel groups are allowed to be stored in the vector buffer 504 simultaneously. Since the size of the vector buffer 504 is set based on the value of K1, the distance between the first pixel group and the second pixel group in the encoding order is equal to K1. Further, partial vector information sets of at most K2 pixel groups are allowed to be stored in the partial vector buffer 510 simultaneously. Since the size of the partial vector buffer 510 is set based on the value of K2, the distance between the second pixel group and the third pixel group in the encoding order is equal to K2. In a case where the encoder 508 is equipped with higher computing power, the values of K1 and K2 may be set by smaller positive integers. In another case where the encoder 508 is equipped with lower computing power, the values of K1 and K2 may be set by larger positive integers. It should be noted that the second pixel group may be located in a pixel line identical to or different from (e.g., below) the first pixel line in which the first pixel group is located, and the third pixel group may be located in a pixel line identical to or different from (e.g., below) the pixel line in which the second pixel group is located.

Figure 6:
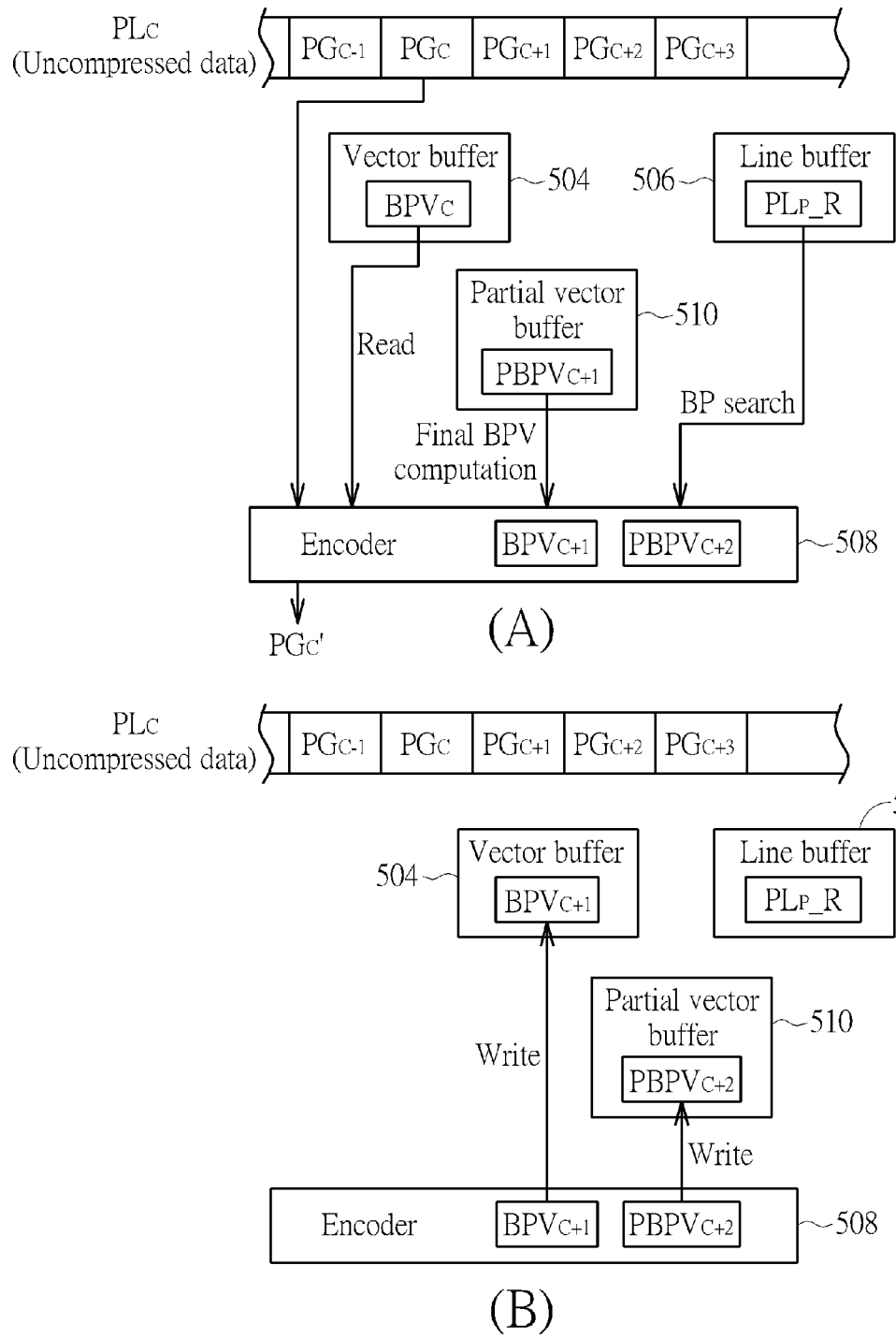
FIG. 6 is a diagram illustrating an exemplary compression operation performed by the compression shown in FIG. 5 according to an embodiment of the present invention.

FIG. 6 is a diagram illustrating an exemplary compression operation performed by the compressor 502 shown in FIG. 5 according to an embodiment of the present invention. Before the encoder 508 starts encoding the current pixel line $PL_C$, the line buffer 506 stores a reconstructed pixel line $PL_P\_R$ obtained from the encoding of the previous pixel line $PL_P$. In this example, K1=1 and K2=1. Hence, the vector buffer 504 implemented in the compressor 502 has a single buffer entry, and the partial vector buffer 510 implemented in the compressor 502 has a single buffer entry. Before the encoder 508 starts encoding the current pixel group $PG_C$ in the current pixel line $PL_C$, the vector buffer 504 stores the final vector information set $BPV_C$ of the current pixel group $PG_C$, and the partial vector buffer 510 stores the partial vector information set $PBPV_{C+1}$ of the next pixel group $PG_{C+1}$. The pixel group $PG_{C+1}$ will be encoded after the encoding of the current pixel group $PG_C$ is completed. In other words, the pixel group $PG_{C+1}$ will become a current pixel group after the encoding of the current pixel group $PG_C$ is completed.

The sub-diagram (A) of FIG. 6 shows a first phase of encoding the current pixel group $PG_C$. The encoder 508 obtains the final vector information set $BPV_C$ from the vector buffer 504, and encodes the current pixel group $PG_C$ with the obtained final vector information set $BPV_C$ to generate an encoded pixel group $PG_C'$ (which is part of the compressed image $IMG_2$ generated from the compressor 502). Since the partial vector information set $PBPV_{C+1}$ is already available in the partial vector buffer 510 and the pixel group $PG_{C+1}$ will be encoded after the encoding of the pixel group $PG_C$ is completed, the encoder 508 obtains the partial vector information set $PBPV_{C+1}$ of the pixel group $PG_{C+1}$ from the partial vector buffer 510, and computes the final vector information set $BPV_{C+1}$ of the pixel group $PG_{C+1}$ based on the obtained partial vector information set $PBPV_{C+1}$. Since the pixel group $PG_{C+2}$ will be encoded after the encoding of the pixel group $PG_{C+1}$ is completed, the encoder 508 computes the partial vector information set $PBPV_{C+2}$ of the pixel group $PG_{C+2}$ by performing BP search based on the reconstructed pixel line $PL_P\_R$.

The sub-diagram (B) of FIG. 6 shows a second phase of encoding the current pixel group $PG_C$. The encoder 508 stores the computed final vector information set $BPV_{C+1}$ into the vector buffer 504, and stores the computed partial vector information set $PBPV_{C+2}$ into the partial vector buffer 510. Hence, at the end of the encoding of the pixel group $PG_C$ (i.e., at the beginning of the encoding of the pixel group $PG_{C+1}$), the vector buffer 504 stores the final vector information set $BPV_{C+1}$ of the pixel group $PG_{C+1}$, and the partial vector buffer 510 stores the partial vector information set $PBPV_{C+2}$ of the pixel group $PG_{C+2}$.

As a person skilled in the art can readily understand details of encoding following pixel groups after reading above paragraphs directed to the example of encoding the pixel group $PG_C$, further description is omitted here for brevity.

The final vector information set and partial vector information set involved in encoding each pixel group is not signaled in a bitstream transmitted from a transmitting end having the compressor 202 to a receiving end having the decompressor 212. Hence, the same BP search operation performed by the encoder 508 used in the compressor 502 is also performed by the decoder 518 used in the decompressor 512.

Please refer to FIG. 5 again. Supposing that the image IMG shown in FIG. 1 is the compressed image $IMG_2$ to be decompressed by the decompressor 512 shown in FIG. 5, the compressed image $IMG_2$ is composed of pixel lines $PL_0$-$PL_{N-1}$, each of the pixel lines $PL_0$-$PL_{N-1}$ is composed of pixel groups $PG_0$-$PG_{N-1}$, and each of the pixel groups $PG_0$-$PG_{M-1}$ is composed of multiple pixels (e.g., 3 pixels). In this embodiment, the partial vector buffer 520 is configured to store a partial vector information set of at least one pixel group at the same time. At a certain time point, each of the at least one pixel group having the partial vector information set simultaneously stored in the partial vector buffer 520 is decoded later than each of at least one pixel group having the final vector information set simultaneously stored in the vector buffer 514. In other words, after the decoding of a current pixel group is completed, any partial vector information set in the partial vector buffer 520 is not used for decoding a next pixel group. Like the vector buffer 214, the vector buffer 514 is used to store a final vector information set of at least one pixel group at the same time, where the maximum number of pixel group(s) having final vector information set(s) simultaneously stored in the vector buffer 514 is smaller than the number of pixel groups of each pixel line. In addition, the sum of the maximum number of pixel group(s) having final vector information set(s) simultaneously stored in the vector buffer 514 and the maximum number of pixel group(s) having partial vector information set(s) simultaneously stored in the partial vector buffer 520 is also smaller than the number of pixel groups of each pixel line. For example, when the decoder 518 is decoding the current pixel line $PL_C$, final vector information sets of at most K1' pixel groups are allowed to be stored in the vector buffer 514 simultaneously; and partial vector information sets of at most K2' pixel groups are allowed to be stored in the partial vector buffer 520 simultaneously, where each of K1' and K2' is a positive integer, and the sum of K1' and K2' is smaller than M (i.e., K1'+K2'<M). It should be noted that K1' may be identical to or different from K1, and K2' may be identical to or different from K2. In one exemplary implementation, the sum of the maximum number of pixel group(s) having final vector information set(s) simultaneously stored in the vector buffer 514 and the maximum number of pixel group(s) having partial vector information set(s) simultaneously stored in the partial vector buffer 520 is a fixed value during decoding of the compressed image $IMG_2$. For example, K1' and K2' are fixed values, such that the value of K1'+K2' is fixed during the decoding of the compressed image $IMG_2$. Similarly, the size of the vector buffer 514 does not depend on the image resolution due to the fact that the vector buffer 514 does not need to store final vector information sets of all pixel groups in one pixel line. Hence, the production cost of the decompressor 512 can be reduced correspondingly.

Before decoding a first pixel group in a first pixel line (e.g., the current pixel group $PG_C$ in the current pixel line $PL_C$), the decoder 518 is configured to derive the final vector information set of the first pixel group from performing BP search upon a second pixel line (e.g., a reconstructed pixel line $PL_P\_R$ obtained from the previous pixel line $PL_P$) different from the first pixel line, and store the final vector information set of the first pixel group into the vector buffer 514; and the decoder 518 is further configured to derive a partial vector information set of a second pixel group (which is decoded later than the first pixel group), and store the partial vector information set of the second pixel group into the partial vector buffer 520.

When decoding the first pixel group in the first pixel line, the decoder 518 is further configured to obtain the final vector information set of the first pixel group from the vector buffer 514, and decode the first pixel group with the obtained final vector information set of the first pixel group. In addition, the decoder 518 is further configured to obtain the partial vector information set of the second pixel group from the partial vector buffer 520, compute a final vector information set of the second pixel group based on the obtained partial vector information set of the second pixel group, and store the computed final vector information set of the second pixel group into the vector buffer 514; and the decoder 518 is further configured to derive a partial vector information set of a third pixel group (which is decoded later than the second pixel group), and store the computed partial vector information set of the third pixel group into the partial vector buffer 520. For example, after the final vector information set of the first pixel group is read from the vector buffer 514 for decoding the first pixel group, the final vector information set of the first pixel group in the vector buffer 514 is allowed to be overwritten. Similarly, after the partial vector information set of the second pixel group is read from the partial vector buffer 520 for computing the final vector information set of the second pixel group, the partial vector information set of the second pixel group in the partial vector buffer 520 is allowed to be overwritten.

In this embodiment, final vector information sets of at most K1' pixel groups are allowed to be stored in the vector buffer 514 simultaneously. Since the size of the vector buffer 514 is set based on the value of K1', the distance between the first pixel group and the second pixel group in the decoding order is equal to K1'. Further, partial vector information sets of at most K2' pixel groups are allowed to be stored in the partial vector buffer 520 simultaneously. Since the size of the partial vector buffer 520 is set based on the value of K2', the distance between the second pixel group and the third pixel group in the decoding order is equal to K2'. In a case where the decoder 518 is equipped with higher computing power, the values of K1' and K2' may be set by smaller positive integers. In another case where the decoder 518 is equipped with lower computing power, the values of K1' and K2' may be set by larger positive integers. It should be noted that the second pixel group may be located in a pixel line identical to or different from (e.g., below) the first pixel line in which the first pixel group is located, and the third pixel group may be located in a pixel line identical to or different from (e.g., below) the pixel line in which the second pixel group is located.

Figure 7:
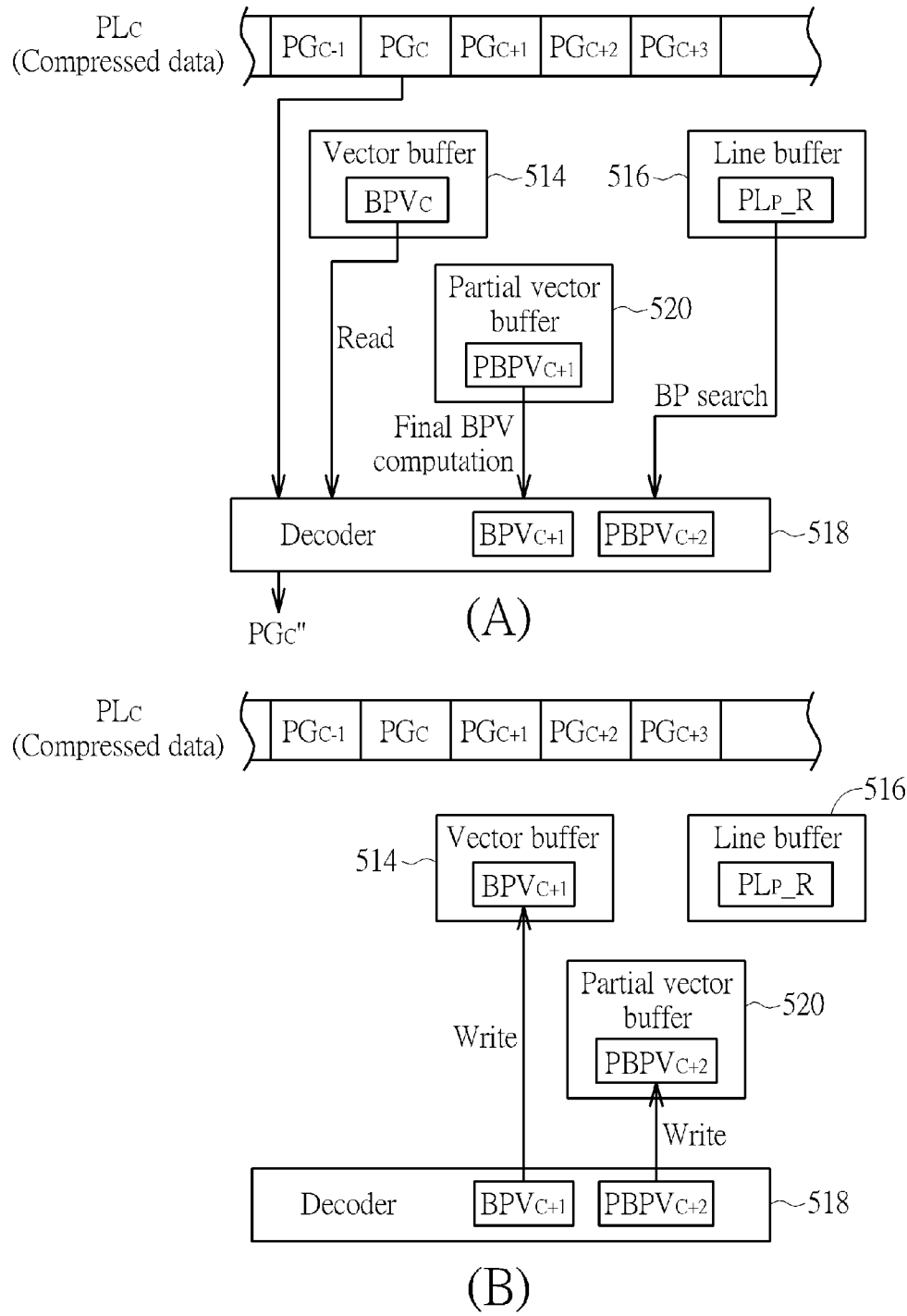
FIG. 7 is a diagram illustrating an exemplary decompression operation performed by the decompression shown in FIG. 5 according to an embodiment of the present invention.

FIG. 7 is a diagram illustrating an exemplary decompression operation performed by the decompressor 512 shown in FIG. 5 according to an embodiment of the present invention. Before the decoder 518 starts decoding the current pixel line $PL_C$, the line buffer 516 stores a reconstructed pixel line $PL_P\_R$ obtained from decoding the previous pixel line $PL_P$. In this example, K1'=1 and K2'=1. Hence, the vector buffer 514 implemented in the decompressor 512 has a single buffer entry, and the partial vector buffer 520 implemented in the decompressor 512 has a single buffer entry. Before the decoder 518 starts decoding the current pixel group $PG_C$ in the current pixel line $PL_C$, the vector buffer 514 stores the final vector information set $BPV_C$ of the current pixel group $PG_C$, and the partial vector buffer 520 stores the partial vector information set $PBPV_{C+1}$ of the next pixel group $PG_{C+1}$. The pixel group $PG_{C+1}$ will be decoded after the decoding of the current pixel group $PG_C$ is completed. In other words, the pixel group $PG_{C+1}$ will become a current pixel group after the decoding of the current pixel group $PG_C$ is completed.

The sub-diagram (A) of FIG. 7 shows a first phase of decoding the current pixel group $PG_C$. The decoder 518 obtains the final vector information set $BPV_C$ from the vector buffer 514, and decodes the current pixel group $PG_C$ with the obtained final vector information set $BPV_C$ to generate a decoded pixel group $PG_C''$ (which is part of the decompressed image $IMG_3$ generated from the decompressor 512). Since the partial vector information set $PBPV_{C+1}$ is already available in the partial vector buffer 520 and the pixel group $PG_{C+1}$ will be decoded after the decoding of the pixel group $PG_C$ is completed, the decoder 518 obtains the partial vector information set $PBPV_{C+1}$ of the pixel group $PG_{C+1}$ from the partial vector buffer 520, and computes the final vector information set $BPV_{C+1}$ of the pixel group $PG_{C+1}$ based on the obtained partial vector information set $PBPV_{C+1}$. Since the pixel group $PG_{C+2}$ will be decoded after the decoding of the pixel group $PG_{C+1}$ is completed, the decoder 518 computes the partial vector information set $PBPV_{C+2}$ of the pixel group $PG_{C+2}$ by performing BP search based on the reconstructed pixel line $PL_{P\_R}$.

The sub-diagram (B) of FIG. 7 shows a second phase of decoding the current pixel group $PG_C$. The decoder 518 stores the computed final vector information set $BPV_{C+1}$ into the vector buffer 514, and stores the computed partial vector information set $PBPV_{C+2}$ into the partial vector buffer 520. Hence, at the end of the decoding of the pixel group $PG_C$ (i.e., at the beginning of the decoding of the pixel group $PG_{C+1}$), the vector buffer 514 stores the final vector information set $BPV_{C+1}$ of the pixel group $PG_{C+1}$, and the partial vector buffer 520 stores the partial vector information set $PBPV_{C+2}$ of the pixel group $PG_{C+2}$.

As a person skilled in the art can readily understand details of decoding following pixel groups after reading above paragraphs directed to the example of decoding the pixel group $PG_C$, further description is omitted here for brevity.

Regarding each of the data processing systems 200 and 500, the compressor 202/502 has one vector buffer 204/504 to store at least the final vector information set of a pixel group currently being encoded, and the decompressor 212/512 has one vector buffer 214/514 to store at least the final vector information set of a pixel group currently being decoded. Hence, the final vector information set needed for encoding a current pixel group is directly available in the vector buffer 204/504, and the final vector information set needed for decoding a current pixel group is directly available in the vector buffer 214/514. If the encoder is configured to have higher computing power and the decoder is configured to have higher computing power, the vector buffers may be omitted. In an alternative design, an encoder may be modified to read a partial vector information set of a pixel group (i.e., a pixel group currently being encoded) from a partial vector buffer, and compute final vector information set of the pixel group based on the partial vector information set of the pixel group; and a decoder may be modified to read a partial vector information set of a pixel group (i.e., a pixel group currently being decoded) from a partial vector buffer, and compute final vector information set of the pixel group based on the partial vector information set of the pixel group.

Figure 8:
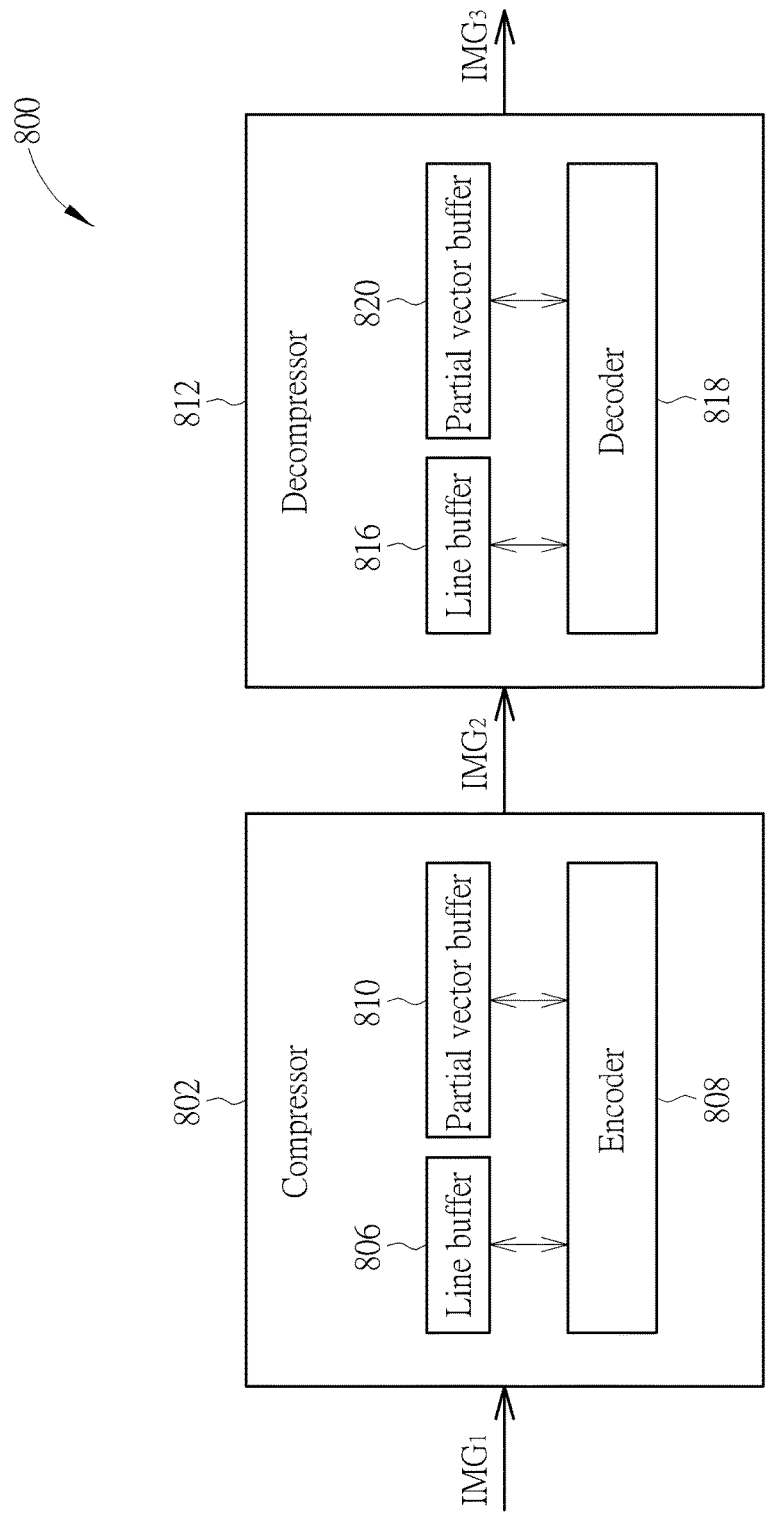
FIG. 8 is a diagram illustrating yet another data processing system according to an embodiment of the present invention.

FIG. 8 is a diagram illustrating yet another data processing system according to an embodiment of the present invention. The data processing system 800 includes a compressor 802 and a decompressor 812, each supporting block prediction (e.g., a block prediction function standardized VESA DSC). In this embodiment, the compressor 802 with block prediction includes a line buffer 806, an encoder 808, and a partial vector buffer 810; and the decompressor 812 with block prediction includes a line buffer 816, a decoder 818, and a partial vector buffer 820. It should be noted that only the circuit components pertinent to the present invention are shown in FIG. 8. In practice, each of compressor 802 and decompressor 812 may include additional circuit components, depending upon actual design consideration.

In this embodiment, the compressor 802 is configured to compress an input image $IMG_1$ to generate a compressed image $IMG_2$, and the decompressor 812 is configured to decompress the compressed image $IMG_2$ to generate a decompressed image $IMG_3$. Concerning the compressor 802, the operation and function of the line buffer 806 are identical to that of the line buffer 206, and the operation and function of the partial vector buffer 810 are similar to that of the vector buffer 204, where the major difference between the partial vector buffer 810 and the vector buffer 204 is that the partial vector buffer 810 is configured to store partial vector information rather than final vector information. Concerning the decompressor 812, the operation and function of the line buffer 816 are identical to that of the line buffer 216, and the operation and function of the partial vector buffer 820 are similar to that of the vector buffer 214, where the major difference between the partial vector buffer 820 and the vector buffer 214 is that the partial vector buffer 820 is configured to store partial vector information rather than final vector information.

Supposing that the image IMG shown in FIG. 1 is the input image $IMG_1$ to be compressed by the compressor 802 shown in FIG. 8, the input image $IMG_1$ is composed of pixel lines $PL_0$-$PL_{N-1}$, each of the pixel lines $PL_0$-$PL_{N-1}$ is composed of pixel groups $PG_0$-$PG_{M-1}$, and each of the pixel groups $PG_0$-$PG_{M-1}$ is composed of multiple pixels (e.g., 3 pixels). In this embodiment, the partial vector buffer 810 is configured to store a partial vector information set of at least one pixel group at the same time, wherein the partial vector information set stored in the partial vector buffer 810 includes at least the partial vector information set of a pixel group currently being encoded. The maximum number of pixel group(s) having partial vector information set(s) simultaneously stored in the partial vector buffer 810 is smaller than the number of pixel groups of each pixel line. For example, when the encoder 808 is encoding the current pixel line $PL_C$, partial vector information sets of at most K3 pixel groups are allowed to be stored in the partial vector buffer 810 simultaneously, where K3 is a positive integer smaller than M (i.e., K3<M). In one exemplary implementation, the maximum number of pixel group(s) having partial vector information set(s) simultaneously stored in the partial vector buffer 810 is a fixed value during encoding of the input image $IMG_1$. That is, the value of K3 is fixed during the encoding of the input image $IMG_1$.

Before encoding a first pixel group in a first pixel line (e.g., the current pixel group $PG_C$ in the current pixel line $PL_C$), the encoder 808 is configured to derive the partial vector information set of the first pixel group from performing BP search upon a second pixel line (e.g., a reconstructed pixel line obtained from the previous pixel line $PL_P$) different from the first pixel line, and store the partial vector information set of the first pixel group into the partial vector buffer 810.

When encoding the first pixel group in the first pixel line, the encoder 808 is further configured to obtain the partial vector information set of the first pixel group from the partial vector buffer 810, compute a final vector information set of the first pixel group based on the obtained partial vector information set of the first pixel group, and encode the first pixel group with the computed final vector information set of the first pixel group. In addition, the encoder 808 is further configured to derive a partial vector information set of a second pixel group (which is encoded later than the first pixel group), and store the partial vector information set of the second pixel group into the partial vector buffer 810. For example, after the partial vector information set of the first pixel group is read from the partial vector buffer 810 for encoding the first pixel group, the partial vector information set of the first pixel group in the partial vector buffer 810 is allowed to be overwritten.

In this embodiment, partial vector information sets of at most K3 pixel groups are allowed to be stored in the partial vector buffer 810 simultaneously. Since the size of the partial vector buffer 810 is set based on the value of K3, the distance between the first pixel group and the second pixel group in the encoding order is equal to K3. In a case where the encoder 808 is equipped with higher computing power, the value of K3 may be set by a smaller positive integer. In another case where the encoder 808 is equipped with lower computing power, the value of K3 may be set by a larger positive integer. It should be noted that the second pixel group may be located in a pixel line identical to or different from (e.g., below) the first pixel line in which the first pixel group is located.

Figure 9:
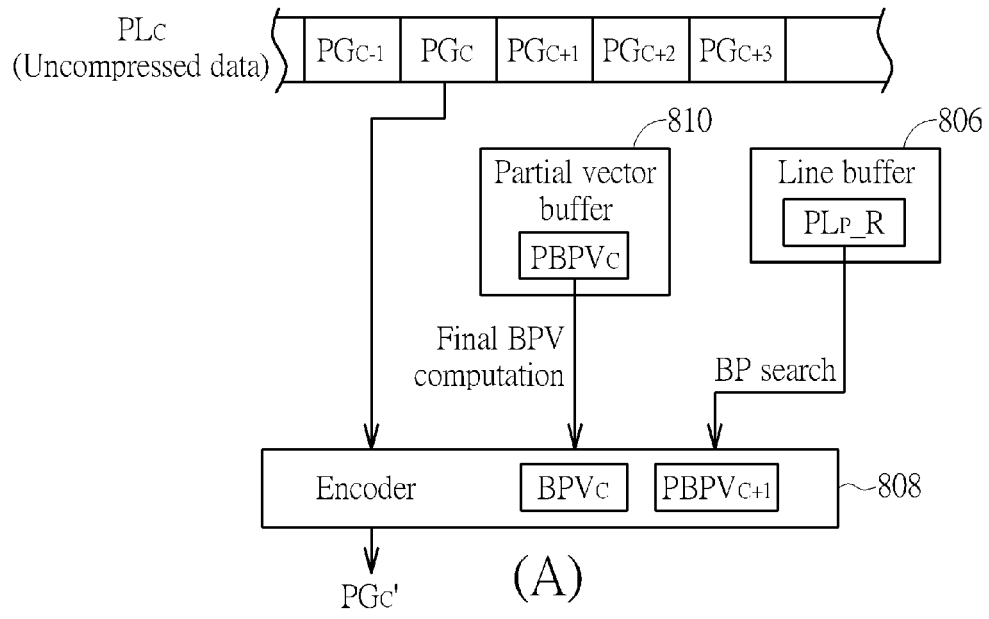
FIG. 9 is a diagram illustrating an exemplary compression operation performed by the compression shown in FIG. 8 according to an embodiment of the present invention.
Figure 9:
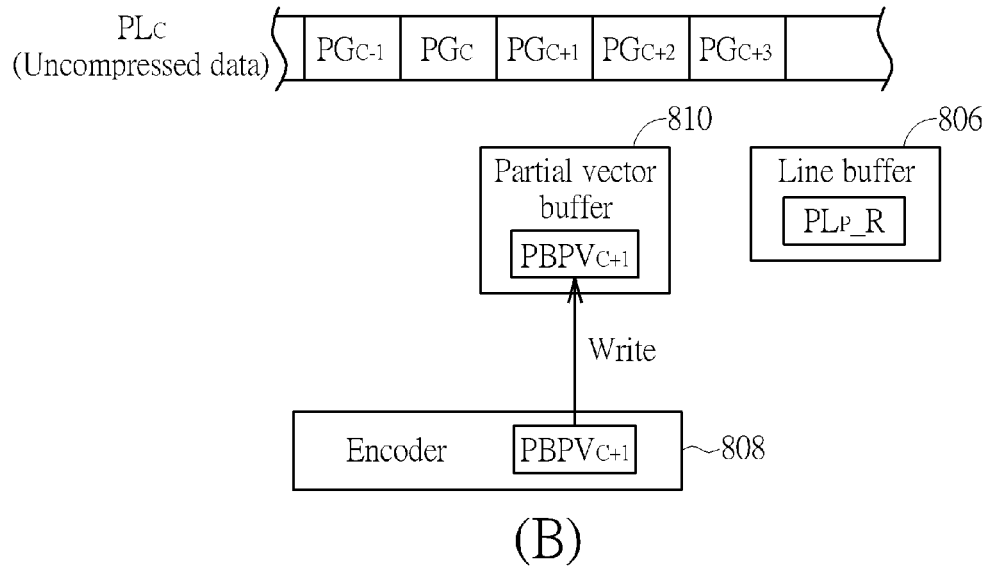

FIG. 9 is a diagram illustrating an exemplary compression operation performed by the compressor 802 shown in FIG. 8 according to an embodiment of the present invention. Before the encoder 808 starts encoding the current pixel line $PL_C$, the line buffer 806 stores a reconstructed pixel line $PL_P\_R$ obtained from the encoding of the previous pixel line $PL_P$. In this example, K3=1. Hence, the partial vector buffer 810 implemented in the compressor 802 has a single buffer entry. Before the encoder 808 starts encoding the current pixel group $PG_C$ in the current pixel line $PL_C$, the partial vector buffer 810 stores the partial vector information set $PBPV_C$ of the current pixel group $PG_C$.

The sub-diagram (A) of FIG. 9 shows a first phase of encoding the current pixel group $PG_C$. The encoder 808 obtains the partial vector information set $PBPV_C$ from the partial vector buffer 810, computes a final vector information set $BPV_C$ based on the obtained partial vector information set $PBPV_C$, and encodes the current pixel group $PG_C$ with the computed final vector information set $BPV_C$ to generate an encoded pixel group $PG_C'$ (which is part of the compressed image $IMG_2$ generated from the compressor 802). Since the pixel group $PG_{C+1}$ will be encoded after the encoding of the pixel group $PG_C$ is completed, the encoder 808 computes the partial vector information set $PBPV_{C+1}$ of the pixel group $PG_{C+1}$ by performing BP search based on the reconstructed pixel line $PL_P\_R$.

The sub-diagram (B) of FIG. 9 shows a second phase of encoding the current pixel group $PG_C$. The encoder 808 stores the computed partial vector information set $PBPV_{C+1}$ into the partial vector buffer 810. Hence, at the end of the encoding of the pixel group $PG_C$ (i.e., at the beginning of the encoding of the pixel group $PG_{C+1}$), the partial vector buffer 810 stores the partial vector information set $PBPV_{C+1}$ of the pixel group $PG_{C+1}$.

As a person skilled in the art can readily understand details of encoding following pixel groups after reading above paragraphs directed to the example of encoding the pixel group $PG_C$, further description is omitted here for brevity.

The partial vector information set involved in encoding each pixel group is not signaled in a bitstream transmitted from a transmitting end using the compressor 202 to a receiving end using the decompressor 212. Hence, the same BP search operation performed by the encoder 808 used in the compressor 802 is also performed by the decoder 818 used in the decompressor 812.

Please refer to FIG. 8 again. Supposing that the image IMG shown in FIG. 1 is the compressed image $IMG_2$ to be decompressed by the decompressor 812 shown in FIG. 8, the compressed image $IMG_2$ is composed of pixel lines $PL_0$-$PL_{N-1}$, each of the pixel lines $PL_0$-$PL_{N-1}$ is composed of pixel groups $PG_0$-$PG_{M-1}$, and each of the pixel groups $PG_0$-$PG_{M-1}$ is composed of multiple pixels (e.g., 3 pixels). In this embodiment, the partial vector buffer 820 is configured to store a partial vector information set of at least one pixel group at the same time, wherein the partial vector information set stored in the partial vector buffer 820 includes at least the partial vector information set of a pixel group currently being decoded. In this embodiment, the maximum number of pixel group(s) having partial vector information set(s) simultaneously stored in the partial vector buffer 820 is smaller than the number of pixel groups of each pixel line. For example, when the decoder 818 is decoding the current pixel line $PL_C$, partial vector information sets of at most K3' pixel groups are allowed to be stored in the partial vector buffer 820 simultaneously, where K3' is a positive integer smaller than M (i.e., K3'<M). It should be noted that K3' may be identical to or different from K3. In one exemplary implementation, the maximum number of pixel group(s) having partial vector information set(s) simultaneously stored in the partial vector buffer 820 is a fixed value during decoding of the compressed image $IMG_2$. That is, the value of K3' is fixed during the decoding of the compressed image $IMG_2$.

Before decoding a first pixel group in a first pixel line (e.g., the current pixel group $PG_C$ in the current pixel line $PL_C$), the decoder 818 is configured to derive the partial vector information set of the first pixel group from performing BP search upon a second pixel line (e.g., a reconstructed pixel line obtained from the previous pixel line $PL_P$) different from the first pixel line, and store the partial vector information set of the first pixel group into the partial vector buffer 820.

When decoding the first pixel group in the first pixel line, the decoder 818 is further configured to obtain the partial vector information set of the first pixel group from the partial vector buffer 820, compute a final vector information set of the first pixel group based on the obtained partial vector information set of the first pixel group, and decode the first pixel group with the computed final vector information set of the first pixel group. In addition, the decoder 818 is further configured to compute a partial vector information set of a second pixel group (which is decoded later than the first pixel group), and store the computed partial vector information set of the second pixel group into the partial vector buffer 820. For example, after the partial vector information set of the first pixel group is read from the partial vector buffer 820 for decoding the first pixel group, the partial vector information set of the first pixel group in the partial vector buffer 820 is allowed to be overwritten.

In this embodiment, partial vector information sets of at most K3' pixel groups are allowed to be stored in the partial vector buffer 820 simultaneously. Since the size of the partial vector buffer 820 is set based on the value of K3', the distance between the first pixel group and the second pixel group in the decoding order is equal to K3'. In a case where the decoder 818 is equipped with higher computing power, the value of K3' may be set by a smaller positive integer. In another case where the decoder 818 is equipped with lower computing power, the value of K3' may be set by a larger positive integer. It should be noted that the second pixel group may be located in a pixel line identical to or different from (e.g., below) the first pixel line in which the first pixel group is located.

Figure 10:
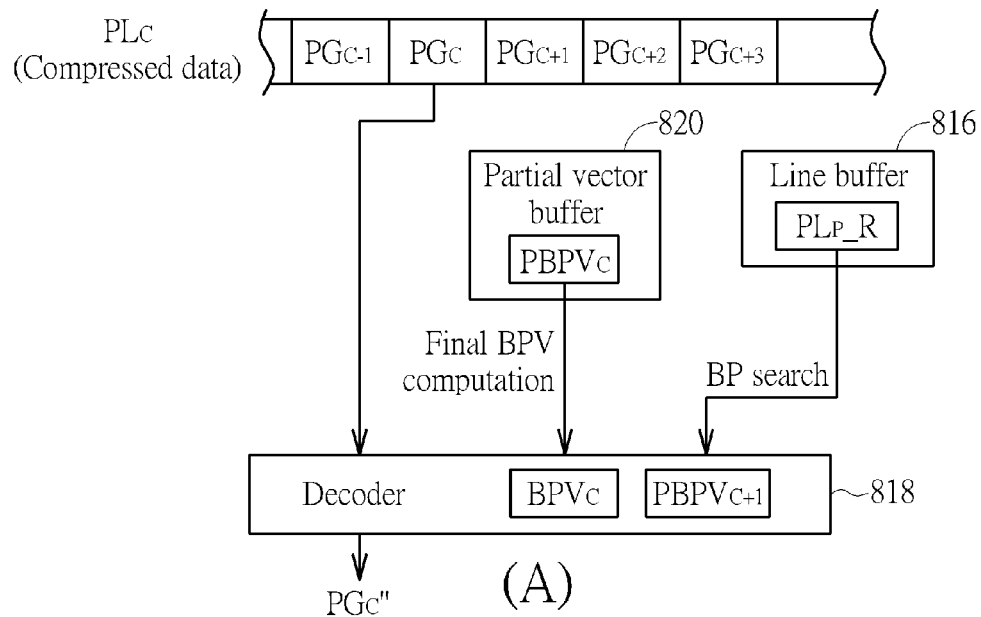
FIG. 10 is a diagram illustrating an exemplary decompression operation performed by the decompression shown in FIG. 8 according to an embodiment of the present invention.
Figure 10:
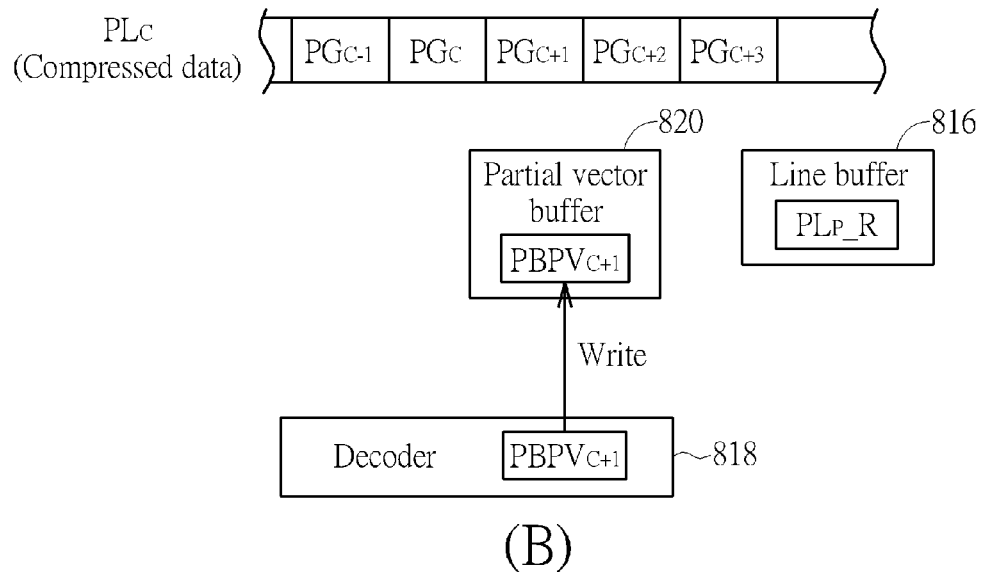

FIG. 10 is a diagram illustrating an exemplary decompression operation performed by the decompressor 812 shown in FIG. 8 according to an embodiment of the present invention. Before the decoder 818 starts decoding the current pixel line $PL_C$, the line buffer 816 stores a reconstructed pixel line $PL_P\_R$ obtained from decoding the previous pixel line $PL_P$. In this example, K3'=1. Hence, the partial vector buffer 820 implemented in the decompressor 812 has a single buffer entry. Before the decoder 818 starts decoding the current pixel group $PG_C$ in the current pixel line $PL_C$, the partial vector buffer 820 stores the partial vector information set $PBPV_C$ of the current pixel group $PG_C$.

The sub-diagram (A) of FIG. 10 shows a first phase of decoding the current pixel group $PG_C$. The decoder 818 obtains the partial vector information set $PBPV_C$ of the current pixel group $PG_C$ from the partial vector buffer 820, computes the final vector information set $BPV_C$ of the current pixel group $PG_C$ based on the obtained partial vector information set $PBPV_C$, and decodes the current pixel group $PG_C$ with the computed final vector information set $BPV_C$ to generate a decoded pixel group $PG_C''$ (which is part of the decompressed image $IMG_3$ generated from the decompressor 812). Since the pixel group $PG_{C+1}$ will be decoded after the decoding of the pixel group $PG_C$ is completed, the decoder 818 derives the partial vector information set $PBPV_{C+1}$ of the pixel group $PG_{C+1}$ from performing BP search based on the reconstructed pixel line $PL_P\_R$.

The sub-diagram (B) of FIG. 10 shows a second phase of decoding the current pixel group $PG_C$. The decoder 818 stores the computed partial vector information set $PBPV_{C+1}$ into the partial vector buffer 820. Hence, at the end of the decoding of the pixel group $PG_C$ (i.e., at the beginning of the decoding of the pixel group $PG_{C+1}$), the partial vector buffer 820 stores the partial vector information set $PBPV_{C+1}$ of the pixel group $PG_{C+1}$.

As a person skilled in the art can readily understand details of decoding following pixel groups after reading above paragraphs directed to the example of decoding the pixel group $PG_C$, further description is omitted here for brevity.

The compressor 202/502/802 is configured to compress the input image $IMG_1$ to generate the compressed image $IMG_2$. The decompressor 212/512/812 is configured to decompress the compressed image $IMG_2$ to generate the decompressed image $IMG_3$. Hence, compressed data transmission between the compressor 202/502/802 and the decompressor 212/512/812 can be realized. In a first exemplary application, the compressor 202/502/802 may be part of an application processor (AP), and the decompressor 212/512/812 may be part of a driver integrated circuit (IC). The compressed image $IMG_2$ may be transmitted from the AP to the driver IC via a display interface. For example, the display interface is a display serial interface (DSI) standardized by a Mobile Industry Processor Interface (MIPI) or an embedded display port (eDP) standardized by VESA. In a second exemplary application, the compressor 202/502/802 may be part of a camera module, and the decompressor 212/512/812 may be part of an AP. The compressed image $IMG_2$ may be transmitted from the camera module to the AP via a camera interface. For example, the camera interface is a camera serial interface (CSI) standardized by MIPI. In a third exemplary application, the compressor 202/502/802 and the decompressor 212/512/812 may be implemented in the same AP. The compressed image $IMG_2$ may be transmitted from the compressor 202/502/802 to the decompressor 212/512/812 via a bus of the AP. For example, the compressor 202/502/802 may be part of a video decoder in the AP, and the decompressor 212/512/812 may be part of a memory device in the AP. For another example, the compressor 202/502/802 may be part of an image signal processor (ISP) in the AP, and the decompressor 212/512/812 may be part of a graphics processing unit (GPU) in the AP. In a fourth exemplary application, the compressor 202/502/802 and the decompressor 212/512/812 may be implemented in the same driver IC. The compressed image $IMG_2$ may be transmitted from the compressor 202/502/802 to the decompressor 212/512/812 via a bus of the drive IC. In a fifth exemplary application, the compressor 202/502/802 and the decompressor 212/512/812 may be implemented in the same camera module. The compressed image $IMG_2$ may be transmitted from the compressor 202/502/802 to the decompressor 212/512/812 via a bus of the camera module.

It should be noted that the present invention has no limitation on the pixel data format of each pixel included in the input image $IMG_1$ to be encoded by the compressor 202/502/802 and the compressed image $IMG_2$ to be decoded by the decompressor 212/512/812. For example, the pixel data format of each pixel may be an RGB/YUV 4:4:4 color format, an RGB/YUV 4:2:2 color format, or an RGB/YUV 4:2:0 color format. When the image is generated from a camera sensor employing a BGGR Bayer pattern color filter array (CFA), each pixel may include one blue color component (B) and one green color component (G), or one red color component (R) and one green color component (G), or one blur color component (B), two green color components (G) and one red color component (R).

The above-mentioned block prediction function is standardized by VESA DSC. However, this is for illustrative purposes only, and is not meant to be a limitation of the present invention. Actually, the proposed compression design and decompression design may be applied to an application using any image compression algorithm with block prediction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A compression method with block prediction, comprising:

utilizing a vector buffer to store at most K final vector information sets at a same time, wherein the K final vector information sets are determined for K pixel groups, respectively, each pixel line of an image is composed of a plurality of pixel groups, a final vector information set of each pixel group comprises a value of a final block prediction vector determined for said each pixel group, the value of the final block prediction vector that is determined for said each pixel group and stored into the vector buffer is a pixel position offset value, K is an integer that is equal to or larger than one, a maximum number of final vector information sets simultaneously stored in the vector buffer is equal to K, and K is smaller than a number of all of the pixel groups of said each pixel line; and when encoding a first pixel group in a first pixel line, obtaining a final vector information set of the first pixel group from the vector buffer, and encoding the first pixel group with the obtained final vector information set of the first pixel group, wherein the final vector information set of the first pixel group stored in the vector buffer is derived from performing block prediction search upon a second pixel line different from the first pixel line;

wherein before the first pixel group is encoded according to the final vector information set of the first pixel group, the final vector information set of the first pixel group is stored in the vector buffer;

wherein after the final vector information set of the first pixel group is read from the vector buffer for encoding the first pixel group and before a second pixel group in the first pixel line is encoded according to a final vector information set of the second pixel group, the final vector information set of the first pixel group stored in the vector buffer is overwritten by the final vector information set of the second pixel group.

2. The compression method of claim 1, wherein the maximum number of final vector information sets simultaneously stored in the vector buffer is a fixed value during encoding of the image.

3. The compression method of claim 1, further comprising:
computing the final vector information set of the second pixel group which is encoded later than the first pixel group, and storing the computed final vector information set of the second pixel group into the vector buffer.

4. The compression method of claim 1, further comprising:
utilizing a partial vector buffer to store at least one partial vector information set at the same time;
wherein the at least one partial vector information set is determined for at least one pixel group, each of the at least one pixel group having the partial vector information set simultaneously stored in the partial vector buffer is encoded later than each of the K pixel groups having the final vector information sets simultaneously stored in the vector buffer.

5. The compression method of claim 4, wherein a sum of the maximum number of final vector information sets simultaneously stored in the vector buffer and a maximum number of the at least one partial vector information set simultaneously stored in the partial vector buffer is smaller than the number of the pixel groups of said each pixel line.

6. The compression method of claim 4, wherein the maximum number of final vector information sets simultaneously stored in the vector buffer is a fixed value during encoding of the image; and a maximum number of the at least one partial vector information set simultaneously stored in the partial vector buffer is a fixed value during encoding of the image.

7. The compression method of claim 4, further comprising:
obtaining a partial vector information set of the second pixel group from the partial vector buffer, computing the final vector information set of the second pixel group based on the obtained partial vector information set of the second pixel group, and storing the computed final vector information set of the second pixel group into the vector buffer, and
computing a partial vector information set of a third pixel group, and storing the computed partial vector information set of the third pixel group into the partial vector buffer;
wherein the second pixel group is encoded later than the first pixel group, and the third pixel group is encoded later than the second pixel group.

8. A compression method with block prediction, comprising:
utilizing a partial vector buffer to store at most K partial vector information sets at a same time, wherein the K partial vector information sets are determined for K pixel groups, respectively, each pixel line of an image is composed of a plurality of pixel groups, a partial vector information set of each pixel group comprises information involved in deciding a final block prediction vector for said each pixel group, the information that is involved in deciding the final block prediction vector for said each pixel group and stored into the partial vector buffer comprises at least one non-pixel value, K is an integer that is equal to or larger than one, a maximum number of partial vector information sets simultaneously stored in the partial vector buffer is equal to K, and K is smaller than a number of all of the pixel groups of said each pixel line; and when encoding a first pixel group in a first pixel line, obtaining a partial vector information set of the first pixel group from the partial vector buffer, computing a final vector information set of the first pixel group based on the obtained partial vector information set of the first pixel group, and encoding the first pixel group with the computed final vector information set of the first pixel group, wherein the partial vector information set of the first pixel group stored in the partial vector buffer is derived from performing block prediction search upon a second pixel line different from the first pixel line;

wherein before the final vector information set of the first pixel group is computed according to the partial vector information set of the first pixel group, the partial vector information set of the first pixel group is stored in the partial vector buffer;

wherein after the partial vector information set of the first pixel group is read from the partial vector buffer for computing the final vector information set of the first pixel group and before a final vector information set of a second pixel group in the first pixel line is computed according to a partial vector information set of the second pixel group, the partial vector information set of the first pixel group stored in the partial vector buffer is overwritten by the partial vector information set of the second pixel group.

9. The compression method of claim 8, further comprising:
computing the partial vector information set of the second pixel group which is encoded later than the first pixel group, and
storing the computed partial vector information set of the second pixel group into the partial vector buffer.

10. A decompression method with block prediction, comprising:
utilizing a vector buffer to store at most K final vector information sets at a same time, wherein the K final vector information sets are determined for K pixel groups, respectively, each pixel line of an image is composed of a plurality of pixel groups, a final vector information set of each pixel group comprises a value of a final block prediction vector determined for said each pixel group, the value of the final block prediction vector that is determined for said each pixel group and stored into the vector buffer is a pixel position offset value, K is an integer that is equal to or larger than one, a maximum number of final vector information sets simultaneously stored in the vector buffer is equal to K, and K is smaller than a number of all of the pixel groups of said each pixel line; and when decoding a first pixel group in a first pixel line, obtaining a final vector information set of the first pixel group from the vector buffer, and decoding the first pixel group with the obtained final vector information set of the first pixel group, wherein the final vector information set of the first pixel group stored in the vector buffer is derived from performing block prediction search upon a second pixel line different from the first pixel line;

wherein before the first pixel group is decoded according to the final vector information set of the first pixel group, the final vector information set of the first pixel group is stored in the vector buffer;

wherein after the final vector information set of the first pixel group is read from the vector buffer for decoding the first pixel group and before a second pixel group in the first pixel line is decoded according to a final vector information set of the second pixel group, the final vector information set of the first pixel group stored in the vector buffer is overwritten by the final vector information set of the second pixel group.

11. The decompression method of claim 10, wherein the maximum number of final vector information sets simultaneously stored in the vector buffer is a fixed value during decoding of the image.

12. The decompression method of claim 10, further comprising:
computing the final vector information set of the second pixel group which is decoded later than the first pixel group, and storing the computed final vector information set of the second pixel group into the vector buffer.

13. The decompression method of claim 10, further comprising:
utilizing a partial vector buffer to store at least one partial vector information set at the same time;
wherein the at least one partial vector information set is determined for at least one pixel group, each of the at least one pixel group having the partial vector information set simultaneously stored in the partial vector buffer is decoded later than each of the K pixel groups having the final vector information sets simultaneously stored in the vector buffer.

14. The decompression method of claim 13, wherein a sum of the maximum number of final vector information sets simultaneously stored in the vector buffer and a maximum number of the at least one partial vector information set simultaneously stored in the partial vector buffer is smaller than the number of the pixel groups of said each pixel line.

15. The decompression method of claim 13, wherein the maximum number of final vector information sets simultaneously stored in the vector buffer is a fixed value during decoding of the image; and a maximum number of the at least one partial vector information set simultaneously stored in the partial vector buffer is a fixed value during decoding of the image.

16. The decompression method of claim 13, further comprising:
obtaining a partial vector information set of the second pixel group from the partial vector buffer, computing the final vector information set of the second pixel group based on the obtained partial vector information set of the second pixel group, and storing the computed final vector information set of the second pixel group into the vector buffer; and
computing a partial vector information set of a third pixel group, and storing the computed partial vector information set of the third pixel group into the partial vector buffer;

wherein the second pixel group is decoded later than the first pixel group, and the third pixel group is decoded later than the second pixel group.

17. A decompression method with block prediction, comprising:
utilizing a partial vector buffer to store at most K partial vector information sets at a same time, wherein the K partial vector information sets are determined for K pixel groups, respectively, each pixel line of an image is composed of a plurality of pixel groups, a partial vector information set of each pixel group comprises information involved in deciding a final block prediction vector for said each pixel group, the information that is involved in deciding the final block prediction vector for said each pixel group and stored into the partial vector buffer comprises at least one non-pixel value, K is an integer that is equal to or larger than one, a maximum number of partial vector information sets simultaneously stored in the partial vector buffer is equal to K, and K is smaller than a number of all of the pixel groups of said each pixel line; and when decoding a first pixel group in a first pixel line, obtaining a partial vector information set of the first pixel group from the partial vector buffer, computing a final vector information set of the first pixel group based on the obtained partial vector information set of the first pixel group, and decoding the first pixel group with the computed final vector information set of the first pixel group, wherein the partial vector information set of the first pixel group stored in the partial vector buffer is derived from performing block prediction search upon a second pixel line different from the first pixel line;

wherein before the final vector information set of the first pixel group is computed according to the partial vector information set of the first pixel group, the partial vector information set of the first pixel group is stored in the partial vector buffer;

wherein after the partial vector information set of the first pixel group is read from the partial vector buffer for computing the final vector information set of the first pixel group and before a final vector information set of a second pixel group in the first pixel line is computed according to a partial vector information set of the second pixel group, the partial vector information set of the first pixel group stored in the partial vector buffer is overwritten by the partial vector information set of the second pixel group.

18. The decompression method of claim 17, further comprising:
computing the partial vector information set of the second pixel group which is decoded later than the first pixel group, and storing the computed partial vector information set of the second pixel group into the partial vector buffer.

19. A compressor with block prediction, comprising:
a vector buffer, configured to store at most K final vector information sets at a same time, wherein the K final vector information sets are determined for K pixel groups, respectively, each pixel line of an image is composed of a plurality of pixel groups, a final vector information set of each pixel group comprises a value of a final block prediction vector determined for said each pixel group, the value of the final block prediction vector that is determined for said each pixel group and stored into the vector buffer is a pixel position offset value, K is an integer that is equal to or larger than one, a maximum number of final vector information sets simultaneously stored in the vector buffer is equal to K, and K is smaller than a number of all of the pixel groups of said each pixel line; and an encoder, wherein when encoding a pixel group in a first pixel line, the encoder is configured to obtain a final vector information set of the pixel group from the vector buffer, and encode the pixel group with the obtained final vector information set of the pixel group, wherein the encoder is further configured to derive the final vector information set of the pixel group stored in the vector buffer from performing block prediction search upon a second pixel line different from the first pixel line;

wherein before the first pixel group is encoded according to the final vector information set of the first pixel group, the final vector information set of the first pixel group is stored in the vector buffer;

wherein after the final vector information set of the first pixel group is read from the vector buffer for encoding the first pixel group and before a second pixel group in the first pixel line is encoded according to a final vector information set of the second pixel group, the encoder overwrites the final vector information set of the first pixel group stored in the vector buffer by the final vector information set of the second pixel group.

20. A compressor with block prediction, comprising:

a partial vector buffer, configured to store at most K partial vector information sets at a same time, wherein the K partial vector information sets are determined for K pixel groups, respectively, each pixel line of an image is composed of a plurality of pixel groups, a partial vector information set of each pixel group comprises information involved in deciding a final block prediction vector for said each pixel group, the information that is involved in deciding the final block prediction vector for said each pixel group and stored into the partial vector buffer comprises at least one non-pixel value, K is an integer that is equal to or larger than one, a maximum number of partial vector information sets simultaneously stored in the partial vector buffer is equal to K, and K is smaller than a number of all of the pixel groups of said each pixel line; and an encoder, wherein when encoding a pixel group in a first pixel line, the encoder is configured to obtain partial vector information set of the pixel group from the partial vector buffer, compute a final vector information set of the pixel group based on the obtained partial vector information set of the pixel group, and encode the pixel group with the computed final vector information set of the pixel group, wherein the encoder is further configured to derive the partial vector information set of the pixel group stored in the partial vector buffer from performing block prediction search upon a second pixel line different from the first pixel line;

wherein before the final vector information set of the first pixel group is computed according to the partial vector information set of the first pixel group, the partial vector information set of the first pixel group is stored in the partial vector buffer;

wherein after the partial vector information set of the first pixel group is read from the partial vector buffer for computing the final vector information set of the first pixel group and before a final vector information set of a second pixel group in the first pixel line is computed according to a partial vector information set of the second pixel group, the encoder overwrites the partial vector information set of the first pixel group stored in the partial vector buffer by the partial vector information set of the second pixel group.

21. A decompressor with block prediction, comprising:

a vector buffer, configured to store at most K final vector information sets at a same time, wherein the K final vector information sets are determined for K pixel groups, respectively, each pixel line of an image is composed of a plurality of pixel groups, a final vector information set of each pixel group comprises a value of a final block prediction vector determined for said each pixel group, the value of the final block prediction vector that is determined for said each pixel group and stored into the vector buffer is a pixel position offset value, K is an integer that is equal to or larger than one, a maximum number of final vector information sets simultaneously stored in the vector buffer is equal to K, and K is smaller than a number of all of the pixel groups of said each pixel line; and a decoder, wherein when decoding a pixel group in a first pixel line, the decoder is configured to obtain a final vector information set of the pixel group from the vector buffer, and decode the pixel group with the obtained final vector information set of the pixel group, wherein the decoder is further configured to derive the final vector information set of the pixel group stored in the vector buffer from performing block prediction search upon a second pixel line different from the first pixel line;

wherein before the first pixel group is decoded according to the final vector information set of the first pixel group, the final vector information set of the first pixel group is stored in the vector buffer;

wherein after the final vector information set of the first pixel group is read from the vector buffer for decoding the first pixel group and before a second pixel group in the first pixel line is decoded according to a final vector information set of the second pixel group, the decoder overwrites the final vector information set of the first pixel group stored in the vector buffer by the final vector information set of the second pixel group.

22. A decompressor with block prediction, comprising:

a partial vector buffer, configured to store at most K partial vector information sets at a same time, wherein the K partial vector information sets are determined for K pixel groups, respectively, each pixel line of an image is composed of a plurality of pixel groups, a partial vector information set of each pixel group comprises information involved in deciding a final block prediction vector for said each pixel group, the information that is involved in deciding the final block prediction vector for said each pixel group and stored into the partial vector buffer comprises at least one non-pixel value, K is an integer that is equal to or larger than one, a maximum number of partial vector information sets simultaneously stored in the partial vector buffer is equal to K, and K is smaller than a number of all of the pixel groups of said each pixel line; and a decoder, wherein when decoding a pixel group in a first pixel line, the decoder is configured to obtain a partial vector information set of the pixel group from the partial vector buffer, compute a final vector information set of the pixel group based on the obtained partial vector information set of the pixel group, and decode the pixel group with the computed final vector information set of the pixel group, wherein the decoder is further configured to derive the partial vector information set of the pixel group stored in the partial vector buffer from performing block prediction search upon a second pixel line different from the first pixel line;

wherein before the final vector information set of the first pixel group is computed according to the partial vector information set of the first pixel group, the partial vector information set of the first pixel group is stored in the partial vector buffer;

wherein after the partial vector information set of the first pixel group is read from the partial vector buffer for computing the final vector information set of the first pixel group and before a final vector information set of a second pixel group in the first pixel line is computed according to a partial vector information set of the second pixel group, the decoder overwrites the partial vector information set of the first pixel group stored in the partial vector buffer by the partial vector information set of the second pixel group.

* * * * *